US012469470B2

(12) United States Patent
Chen et al.

(10) Patent No.: US 12,469,470 B2
(45) Date of Patent: Nov. 11, 2025

(54) DISPLAY DEVICE AND PANEL DRIVE CIRCUIT THEREOF, AND METHOD FOR CHARGE BLEED-OFF

(71) Applicants: Fuzhou BOE Optoelectronics Technology Co., Ltd., Fujian (CN); BOE Technology Group Co., Ltd., Beijing (CN)

(72) Inventors: Jinfeng Chen, Beijing (CN); Nani Liu, Beijing (CN); Yifeng Su, Beijing (CN); Xiaoli Kong, Beijing (CN); Qibiao Lin, Beijing (CN); Qiaoni Wang, Beijing (CN); Zhe Huang, Beijing (CN)

(73) Assignees: Fuzhou BOE Optoelectronics Technology Co., Ltd., Fujian (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/702,291

(22) PCT Filed: May 6, 2023

(86) PCT No.: PCT/CN2023/092492
§ 371 (c)(1),
(2) Date: Apr. 17, 2024

(87) PCT Pub. No.: WO2023/221789
PCT Pub. Date: Nov. 23, 2023

(65) Prior Publication Data

US 2024/0412705 A1 Dec. 12, 2024

(30) Foreign Application Priority Data

May 16, 2022 (CN) ........................ 202210527893.X

(51) Int. Cl.
*G09G 3/36* (2006.01)
*G09G 3/20* (2006.01)

(52) U.S. Cl.
CPC ......... *G09G 3/3648* (2013.01); *G09G 3/2096* (2013.01); *G09G 3/3614* (2013.01);
(Continued)

(58) Field of Classification Search
CPC ............... G09G 3/3648; G09G 3/3614; G09G 2310/0289; G09G 2310/08; G09G 2320/0257; G09G 2330/027
See application file for complete search history.

(56) References Cited

U.S. PATENT DOCUMENTS

2002/0041279 A1* 4/2002 Chou .................. G09G 3/3611 323/284
2008/0170025 A1* 7/2008 Song .................. G09G 3/3688 345/96

FOREIGN PATENT DOCUMENTS

CN 101777320 A 7/2010
CN 201673657 U 12/2010
(Continued)

OTHER PUBLICATIONS

CN202210527893.X first office action dated Jan. 19, 2023.

*Primary Examiner* — Dennis P Joseph
(74) *Attorney, Agent, or Firm* — IPro, PLLC

(57) ABSTRACT

A display device and a panel drive circuit thereof, and a method for charge bleed-off are disclosed, relating to the field of display technologies. The panel drive circuit includes a panel control circuit and a display drive circuit. In the case that a display panel is turned off, the panel control circuit transmits at least one of a display drive signal and a charge bleed-off signal sequentially to the display drive circuit before a potential of a power supply signal drops to less than a potential threshold, such that the display drive
(Continued)

circuit sequentially performs at least one of controlling the display panel to display a second picture that is monochrome and bleeding off charges in advance.

20 Claims, 11 Drawing Sheets

(52) U.S. Cl.
CPC . *G09G 2310/0289* (2013.01); *G09G 2310/08* (2013.01); *G09G 2320/0247* (2013.01); *G09G 2320/0257* (2013.01); *G09G 2330/027* (2013.01); *G09G 2360/145* (2013.01)

(56) References Cited

FOREIGN PATENT DOCUMENTS

| | | | | |
|---|---|---|---|---|
| CN | 102237051 | A | 11/2011 | |
| CN | 102867491 | A | 1/2013 | |
| CN | 104021758 | A | 9/2014 | |
| CN | 104464673 | A | 3/2015 | |
| CN | 107369419 | A | 11/2017 | |
| CN | 107564491 | A | 1/2018 | |
| CN | 108121094 | A | 6/2018 | |
| CN | 108231022 | A | 6/2018 | |
| CN | 108257570 | A | 7/2018 | |
| CN | 108538267 | A | 9/2018 | |
| CN | 109817137 | A | 5/2019 | |
| CN | 209000516 | U | 6/2019 | |
| CN | 109979375 | A | 7/2019 | |
| CN | 112735346 | A | 4/2021 | |
| CN | 112992097 | * | 6/2021 | ........... G09G 3/3648 |
| CN | 112992097 | A | 6/2021 | |
| CN | 113436587 | A | 9/2021 | |
| CN | 214587964 | U | 11/2021 | |
| CN | 114724525 | A | 7/2022 | |
| JP | 2012022160 | A | 2/2012 | |
| KR | 20140042614 | A | 4/2014 | |

* cited by examiner

DISPLAY DEVICE AND PANEL DRIVE CIRCUIT THEREOF, AND METHOD FOR CHARGE BLEED-OFF

The present application is a National Stage of International Application No. PCT/CN2023/092492 filed on May 6, 2023, which claims priority to Chinese Patent Application No. 202210527893.X, filed on May 16, 2022 and entitled "DISPLAY APPARATUS, PANEL DRIVE CIRCUIT THEREOF, AND CHARGE DISCHARGE METHOD", the contents of both of which are herein incorporated by reference in their entirety.

TECHNICAL FIELD

The present disclosure relates to the field of display technologies, and in particular, relates to a display device and a panel drive circuit thereof, and a method for charge bleed-off.

BACKGROUND

In a liquid crystal display (LCD) panel, a pixel capacitor formed by a pixel electrode and a common electrode stores charges during display. It has been tested that the LCD panel may have image sticking if the charges still remain in the pixel capacitor for a period after the LCD panel stops the display (i.e., turned off).

Therefore, when the LCD panel is turned off, thin film transistors (TFTs) included in pixels in the LCD panel are typically controlled to be simultaneously turned on for a period, such that the charges stored in the pixel capacitor are bled off to prevent the LCD panel from generating image sticking, which is generally referred to as out all on (XON). Currently, the XON process can be summarized as follows: after the LCD panel is turned off, a gate driver pulls up a potential of a gate drive signal transmitted to the pixels under the control of a timing controller when a potential of a power supply signal provided by a power supply terminal drops to a potential threshold, such that the TFTs in the pixels are turned on to bleed off the charges.

SUMMARY

Embodiments of the present disclosure provide a display device and a panel drive circuit thereof, and a method for charge bleed-off. The technical solutions are as follows.

In one aspect, a panel drive circuit applicable to a display device is provided. The display device includes: a display panel and a plurality of pixels on the display panel, the pixels including transistors, where the panel drive circuit includes:

a panel control circuit and a display drive circuit, where the panel control circuit is coupled to a power supply terminal and the display drive circuit, respectively, and the display drive circuit is further configured to be coupled to the plurality of pixels, where the panel control circuit is configured to: transmit, in the case that the display panel is detected to be turned on, a first display drive signal to the display drive circuit based on a power supply signal of a first potential provided by the power supply terminal; and transmit, in the case that the display panel is detected to be turned off, at least one target signal of following signals sequentially to the display drive circuit before a potential of the power supply signal drops from the first potential to less than a potential threshold: a second display drive signal and a charge bleed-of signal; and the display drive circuit is configured to: drive the plurality of pixels to emit light based on the first display drive signal such that the display panel displays a plurality of frames of a first picture; drive the plurality of pixels to emit light based on the second display drive signal such that the display panel displays at least one frame of a second picture; and control the transistors in the plurality of pixels to be turned on based on the charge bleed-off signal to bleed off charges in the plurality of pixels, where the second picture is different from the first picture, and the second picture is a monochrome picture.

In some embodiments, in the case that a display mode of the display panel is a normal black display mode, the second picture is a black picture; and in the case that the display mode of the display panel is a normal white display mode, the second picture is a white picture.

In some embodiments, the display drive circuit is configured to: drive the plurality of pixels to emit light based on the second display drive signal such that the display panel displays an even number of frames of the second picture, and every two adjacent frames of the second picture have opposite polarities.

In some embodiments, the display drive circuit is configured to: drive the plurality of pixels to emit light based on the second display drive signal such that the display panel displays two frames of the second picture.

In some embodiments, the display device further includes a host terminal;

the panel control circuit is further configured to be coupled to the host terminal, and to receive a control signal transmitted from the host terminal and determine a work state of the display panel based on the control signal, where the control signal being at the first potential indicates that the display panel is in a turn-on state, the control signal being at a second potential indicates that the display panel is in a turn-off state, and in the case that the display panel is turned off, a potential of the control signal changes from the first potential to the second potential before the potential of the power supply signal starts to drop; and the panel control circuit is further configured to transmit the target signal to the display drive circuit in the case that the display panel is determined to be turned off based on the control signal.

In some embodiments, the control signal is a display input signal transmitted from the host terminal to the panel control circuit, and the panel control circuit is further configured to generate the first display drive signal based on the display input signal.

In some embodiments, the control signal is a signal generated by the host terminal based on the detected work state of the display panel.

In some embodiments, the display device further includes: a backlight disposed at a side of the display panel;

the panel control circuit is further configured to detect a light emission state of the backlight and determine the work state of the display panel based on the light emission state of the backlight, where the backlight being in a light-emitting state indicates that the display panel is in the turn-on state, the backlight being in a non-light-emitting state indicates that the display panel is in the turn-off state, and in the case that the display panel is turned off, the backlight switches from the light-emitting state to the non-light-emitting state before the potential of the power supply signal starts to drop; and the panel control circuit is further configured to transmit the target signal to the display drive circuit in the case that the display panel is determined to be turned off based on the light emission state of the backlight.

In some embodiments, the panel control circuit includes: a light emission detection sub-circuit, a timing controller, a level shifter, and a switching sub-circuit;

the light emission detection sub-circuit is disposed at a side of the backlight and is coupled to a pull-down power terminal and an input interface of the timing controller, respectively, and the light emission detection sub-circuit is configured to control a connection between the pull-down power terminal and the input interface of the timing controller to be switched on in the case that the backlight is detected to be light-emitting, and control the connection between the pull-down power terminal and the input interface of the timing controller to be switched off in the case that the backlight is detected to be non-light-emitting;

the input interface of the timing controller is further coupled to the power supply terminal, an output interface of the timing controller is coupled to a control terminal of the switching sub-circuit, and the timing controller is configured to transmit a turn-on signal to the control terminal of the switching sub-circuit based on a pull-down power signal transmitted from the pull-down power terminal to the input interface, and transmit a turn-off signal to the control terminal of the switching sub-circuit based on the power supply signal transmitted from the power supply terminal to the input interface;

an input terminal of the switching sub-circuit is coupled to the power supply terminal, an output terminal of the switching sub-circuit is coupled to the pull-down power terminal and the level shifter, respectively, and the switching sub-circuit is configured to control a connection between the power supply terminal and the level shifter to be switched on in response to the turn-on signal, and control the connection between the power supply terminal and the level shifter to be switched off in response to the turn-off signal; and the level shifter is further coupled to the display drive circuit, and the level shifter is configured to transmit the target signal to the display drive circuit based on the pull-down power signal transmitted from the pull-down power terminal, and transmit the first display drive signal to the display drive circuit based on the power supply signal transmitted from the power supply terminal.

In some embodiments, the light emission detection sub-circuit is a photoelectric conversion diode; and the switching sub-circuit includes a switching transistor;

an input terminal of the photoelectric conversion diode is coupled to the pull-down power terminal, and an output terminal of the photoelectric conversion diode is coupled to the input interface of the timing controller; and the output interface of the timing controller is coupled to a gate of the switching transistor, a first electrode of the switching transistor is coupled to the power supply terminal, and a second electrode of the switching transistor is coupled to the pull-down power terminal.

In some embodiments, the panel control circuit further includes:

a first resistor connected between the power supply terminal and the input interface of the timing controller in series;

a second resistor connected between the power supply terminal and the output interface of the timing controller in series; and a third resistor connected between the pull-down power terminal and the output terminal of the switching sub-circuit in series.

In some embodiments, the plurality of pixels are arranged in an array, and the display drive circuit includes a gate driver and a source driver;

the gate driver is coupled to the plurality of pixels via a plurality of gate lines and is configured to transmit gate drive signals to the plurality of pixels row by row based on the first display drive signal and the second display drive signal, and transmit a turn-on signal to the transistors in the plurality of pixels based on the charge bleed-off signal;

the source driver is coupled to the plurality of pixels via a plurality of data lines and is configured to transmit data signals to the plurality of pixels based on the first display drive signal and the second display drive signal, and the data signals transmitted from the source driver to the plurality of pixels based on the first display drive signal is different from the data signals transmitted to the plurality of pixels based on the second display drive signal; and the plurality of pixels are configured to emit light in response to the gate drive signals and the data signals, and the transistors in the plurality of pixels are configured to be turned on in response to the turn-on signal.

In some embodiments, the panel control circuit is further configured to: transmit, in the case that the display panel is detected to be turned off, the charge bleed-off signal to the display drive circuit before the potential of the power supply signal drops from the first potential to less than the potential threshold but greater than the second potential.

In another aspect, a method for charge bleed-off applicable to the panel control circuit included in the panel drive circuit as defined in the above aspect is provided. The method for charge bleed-off includes:

detecting whether a display panel is turned off, transmitting, in the case that the display panel is detected to be turned on, a first display drive signal to a coupled display drive circuit based on a power supply signal of a first potential provided by a coupled power supply terminal; and transmitting, in the case that the display panel is detected to be turned off, at least one target signal of following signals sequentially to the display drive circuit before a potential of the power supply signal drops from the first potential to less than a potential threshold: a second display drive signal and a charge bleed-of signal, where the first display drive signal is used to instruct the display drive circuit to drive a plurality of pixels to emit light such that the display panel displays a plurality of frames of a first picture, the second display drive signal is used to instruct the display drive circuit to drive the plurality of pixels to emit light such that the display panel displays at least one frame of a second picture, and the charge bleed-off signal is used to instruct the display drive circuit to control transistors in the plurality of pixels to be turned on to bleed off charges in the plurality of pixels, where the second picture is different from the first picture, and the second picture is a monochrome picture.

In still another aspect, a display device is provided. The display device includes: a display panel, a plurality of pixels on the display panel, and the panel drive circuit as defined in the above aspect, where the panel drive circuit is coupled to the plurality of pixels, and the panel drive circuit is configured to drive the plurality of pixels to emit light and control charges in the plurality of pixels to bleed off.

BRIEF DESCRIPTION OF THE DRAWINGS

For clearer illustration of the technical solutions in the embodiments of the present disclosure, the drawings required to be used in the description of the embodiments are briefly introduced below. It is apparent that the drawings in the description below are only for some embodiments of the present disclosure, and for those of ordinary skill in the art, other drawings can be acquired according to the drawings without creative efforts.

DETAILED DESCRIPTION

For clearer descriptions of the objectives, technical solutions, and advantages of the present disclosure, the embodiments of the present disclosure are further described in detail below with reference to the drawings.

Figure 1:
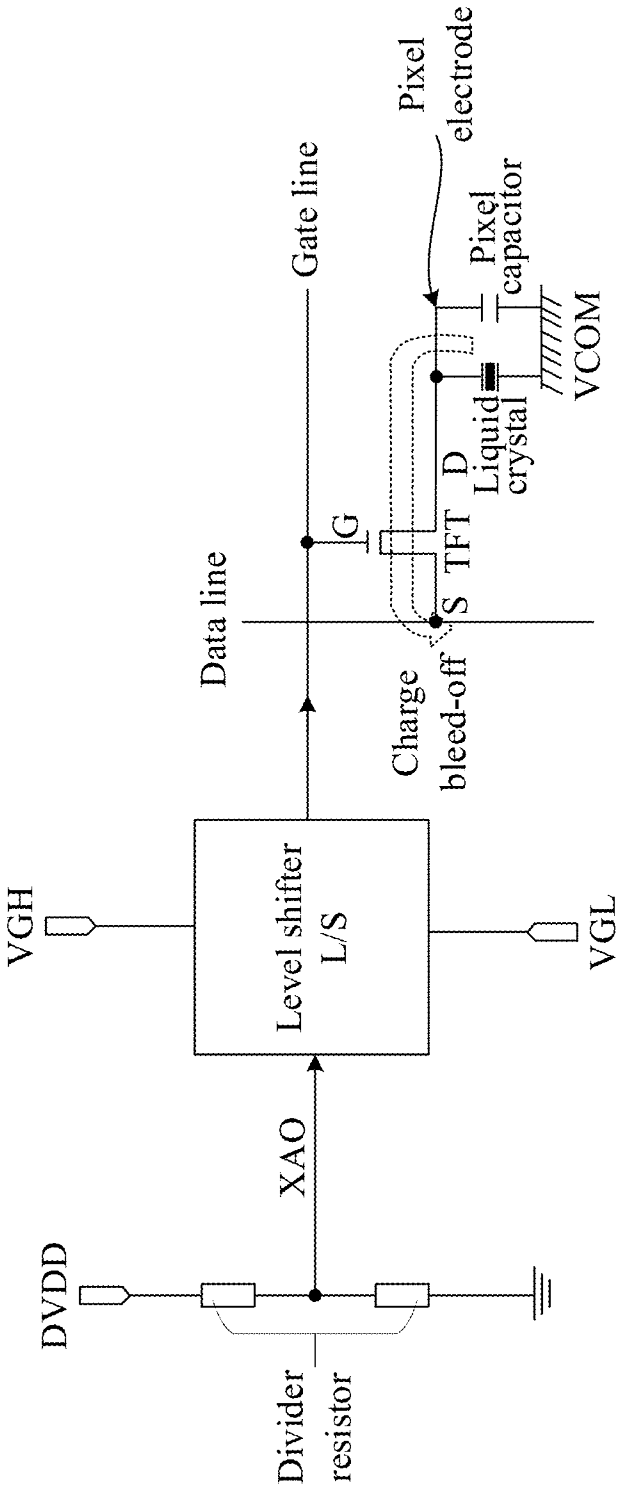
FIG. 1 is an equivalent circuit diagram for charge bleed-off according to some embodiments of the present disclosure.

With reference to FIG. 1, each pixel in an LCD panel typically includes: a pixel electrode and a common electrode VCOM disposed opposite to each other, and a liquid crystal disposed between the pixel electrode and the common electrode VCOM. Moreover, a pixel capacitor may be further formed by the pixel electrode and the common electrode VCOM. The liquid crystal may be deflected by a voltage difference between the pixel electrode and the common electrode VCOM, causing the display panel to emit light. In addition, each pixel typically includes a further transistor TFT. A gate G of the transistor TFT may be coupled (i.e., electrically connected) to gate scan lines, i.e., gate lines. A source S of the transistor TFT may be coupled to data lines. A drain D of the transistor TFT may be coupled to the pixel electrode. The transistor TFT may be turned on in response to a gate drive signal of an active potential on the gate lines, and may be turned off in response to a gate drive signal of an inactive potential on the gate lines. In the case that the transistor TFT is turned on, a data signal provided by the data lines coupled to the source S of the transistor TFT may be transmitted to the pixel electrode via the drain D of the transistor TFT to charge the pixel electrode, such that the liquid crystal is driven to deflect.

Figure 2:
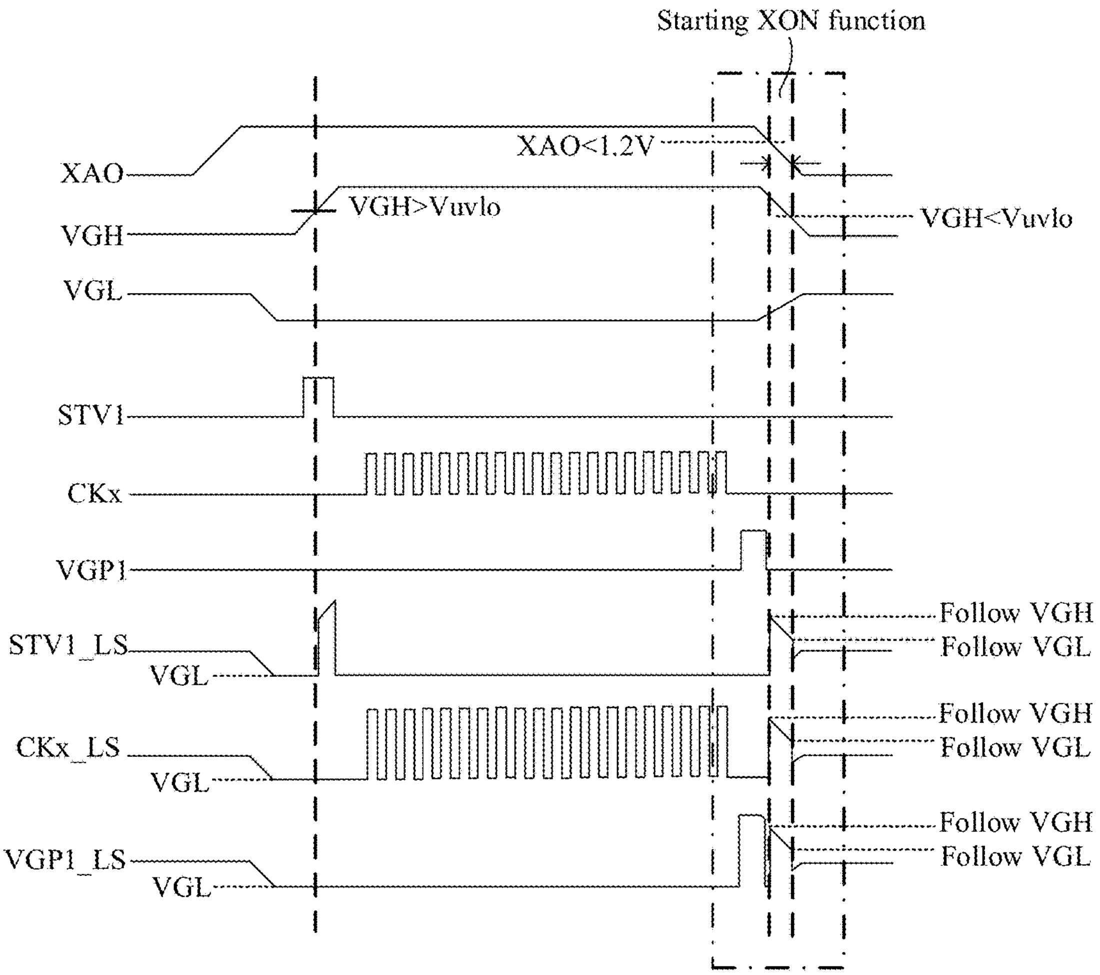
FIG. 2 is an equivalent timing diagram for charge bleed-off according to some embodiments of the present disclosure.

Due to the presence of the pixel capacitor, it is inevitable to store charges during display of the LCD panel. In the case that the charges are not fully bled off after the LCD panel is turned off for a period, the display panel is likely to have image sticking as well as flicker caused by long-term effects of the residual charges. Therefore, with reference to the description in the Background, it can be seen that an XON function may be employed to bleed off the charges stored in the pixel capacitor. As the name implies, the XON function refers to turning on transistors included in all pixels in a display panel to bleed off charges in the case that the display panel is turned off. With reference to FIG. 1 and FIG. 2, the XON function is described as follows:

With reference to FIG. 1, it can be seen that a level shifter (L/S) is included in a panel drive circuit in the prior art. The level shifter L/S is coupled to a power terminal VGH and a power terminal VGL, respectively, and is further configured to receive an XAO signal. A power signal provided by the power terminal VGH has a potential higher than that of a power signal provided by the power terminal VGL, i.e., the power signal provided by the power terminal VGH has a high potential, and the power signal provided by the power terminal VGL has a low potential. With reference to the Background and FIG. 1, it can be seen that the XAO signal is actually acquired by dividing a voltage of a power supply signal provided by a power supply terminal DVDD with a divider resistor. Accordingly, after the display panel is turned off, a potential of the XAO signal decreases as a potential of the power supply signal decreases. Therefore, a voltage standard level of the XAO signal is usually preset in the level shifter L/S, which is also referred to as a preset threshold voltage. In a scenario that the active potential of the gate drive signals is high, in the case that the potential of the XAO signal decreases to less than the preset threshold voltage, the level shifter L/S is triggered to pull up, based on the power signal provided by the coupled power terminal VGH, the gate drive signals (referred to as a gate output) and then transmit the gate drive signals to the gate lines, such that the TFTs in all the pixels are controlled to be turned on simultaneously, implementing charge bleed-off and completing the XON function. The charge bleed-off is substantially equivalent to quickly neutralizing the voltage on the pixel electrode to be equal to a common voltage on the common electrode VCOM, such that it is ensured that no voltage difference is present between the pixel electrode and the common electrode VCOM, causing no direct current (DC) bias.

It should be noted that, as the gate lines are usually coupled to a gate driver to receive the gate drive signals from the gate driver, the level shifter L/S is actually coupled to the gate lines indirectly via the gate driver. That is, the level shifter L/S pulls up the gate drive signals transmitted from the gate driver to the gate lines. In addition, the level shifter L/S is typically coupled to a further timing controller to level-shift various drive signals generated by the timing controller and then transmit the drive signals to corresponding drive circuits (e.g., the gate driver). FIG. 1 schematically shows only one pixel.

However, after the LCD panel is turned off, the potential of the power signal provided by the power terminal VGH also decreases as the potential of the power supply signal provided by the power supply terminal DVDD decreases. In the case that the potential of the power signal provided by VGH decreases to less than Vuvlo, the gate drive signals on the gate lines cannot ensure the transistors TFTs to be turned on, and in this case, XON stops. As such, the XON duration is short, resulting in a failure of an effective charge bleed-off.

For example, with reference to FIG. 2, where the preset threshold voltage is 1.2 volts (V), the XON function can only be performed for a short time before the potential of the XAO signal becomes less than 1.2 V and the potential of the power signal provided by VGH becomes less than Vuvlo. In addition, FIG. 2 further shows the timing of the power signal provided by the power terminal VGL, a turn-on signal STV1, a clock signal CKx, and a power signal VGP1 generated by the timing controller, and the shifted turn-on signal STV1, clock signal CKx, and power signal VGP1, etc., by the level shifter. With reference to FIG. 2, it can be seen that after XON is completed, the level shifter L/S further pulls down the shifted turn-on signal STV1, clock signal CKx, and power signal VGP1 uniformly based on the power signal provided by the power terminal VGL. That is, the Follow VGL is shown in FIG. 2. Similarly, the level shifter L/S pulls up the shifted turn-on signal STV1, clock signal CKx, and power signal VGP1 uniformly based on the power signal provided by the power terminal VGH. That is, the Follow VGH is shown in FIG. 2.

Figure 3:
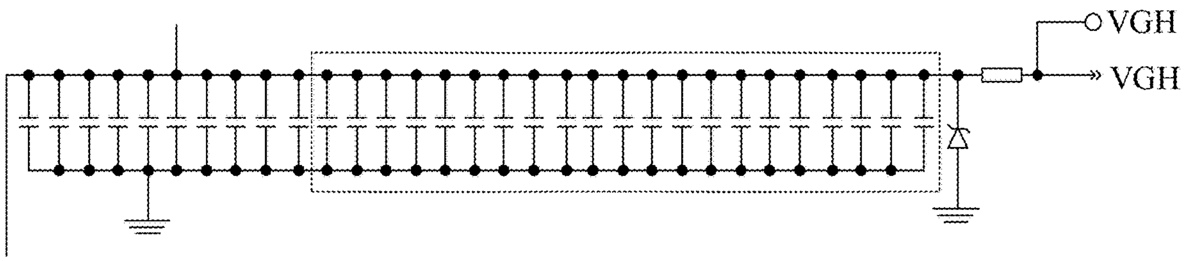
FIG. 3 is a schematic circuit diagram of a shunt capacitor according to some embodiments of the present disclosure.

Therefore, with reference to FIG. 3, a sufficient number of capacitors are connected in parallel to the power terminal VGH in the prior art, such that after the LCD panel is turned off, the potential of the power signal provided by the power terminal VGH can be decreased slowly, prolonging the XON duration indirectly. In a 105-inch LCD panel, for example, where 10 multi-layer ceramic capacitors (MLLCCs) of 22 microfarads (μF) are connected in parallel, with reference to FIG. 4, the XON duration after the LCD panel is turned off is actually measured to be about 230 milliseconds (ms), which cannot achieve an effective charge bleed-off, resulting in severe flicker on the LCD panel after multiple times of powering on and off. With reference to FIG. 5, where 21 MLCCs of 22 μF (see the dashed box in FIG. 3) are added, the XON duration is tested to be extended to 950 ms, which can achieve an effective charge bleed-off. However, this means that 21 large-capacity MLCCs are required to be added to the display device, i.e., more capacitors are added, which is costly and limited in placement. In addition, it is necessary to ensure that the driving capability of a power circuit supplying power to the display panel satisfies the instantaneous pumping load of all capacitors at the instant of turn-on, which further brings a huge burden to the production cost.

Moreover, for some special display products, such as large-dimension LCD panels manufactured by using a COG packaging technology, the power supply load of the power supply terminal DVDD is large due to high integration, and the potential decreases quickly after turn-off. On this basis, it is impossible to ensure that the XON duration is long enough by adding capacitors to achieve an effective charge bleed-off. The COG packaging technology refers to a packaging technology for directly integrating various devices in a display panel on a glass base plate, which is fully referred to as chip on glass.

For example, for a 21.45-inch LCD panel manufactured by using the COG packaging technology, the potential of the power supply signal provided by the power supply terminal DVDD is usually required to reach 3.3 V. After the LCD panel is turned off, XON is triggered in the case that the potential of the XAO signal decreases to 2.8 V (i.e., the preset threshold voltage is 2.8 V). XON stops after the potential of the XAO signal continues to decrease to 2 V. Even on the basis of increasing the capacitors, with reference to FIG. 6, the XON duration is maintained at about 8 ms at most, and it is actually measured that the charges cannot be bled off completely within the 8 ms after the LCD panel is turned off.

Figure 4:
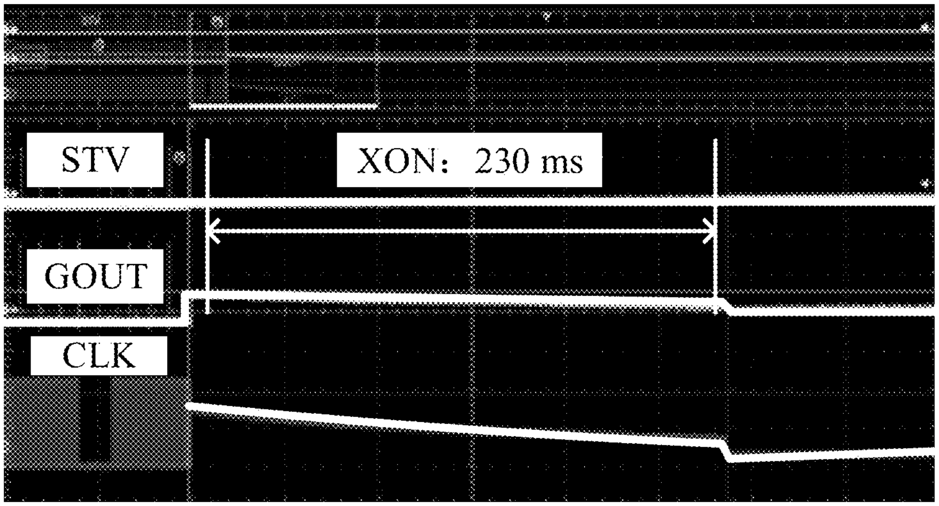
FIG. 4 is an equivalent simulation diagram for indicating an XON duration according to some embodiments of the present disclosure.
Figure 5:
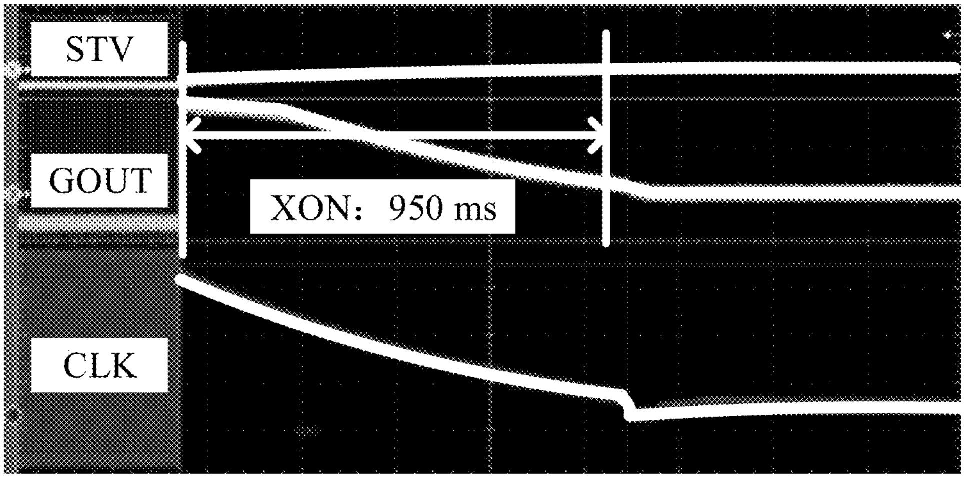
FIG. 5 is another equivalent simulation diagram for indicating an XON duration according to some embodiments of the present disclosure.
Figure 6:
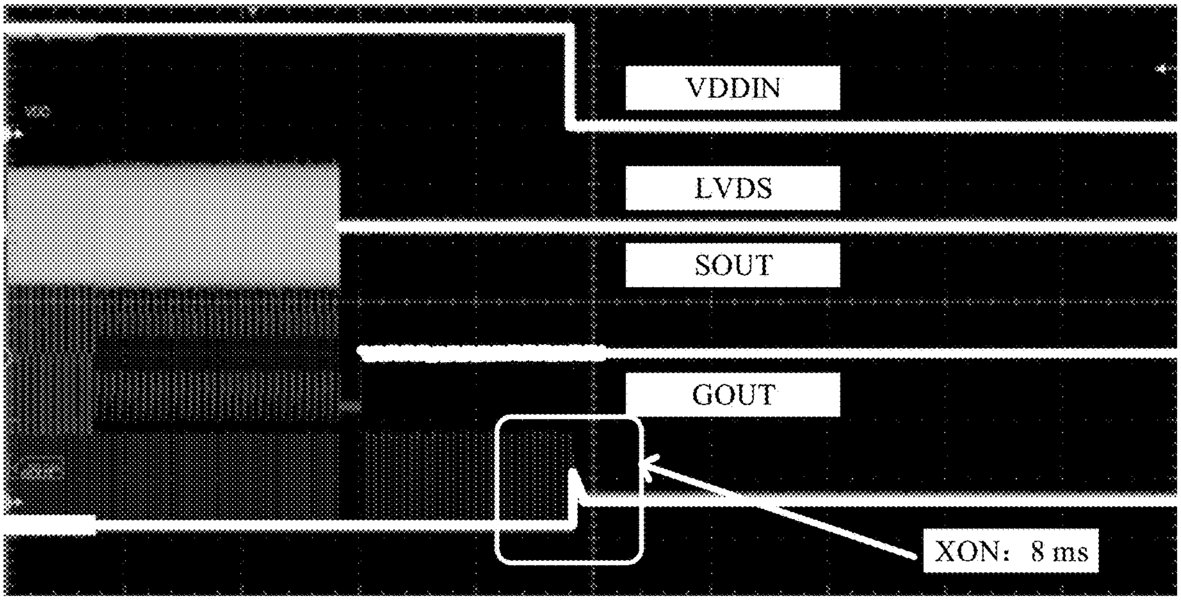
FIG. 6 is still another equivalent simulation diagram for indicating an XON duration according to some embodiments of the present disclosure.

It should be noted that in FIG. 4 to FIG. 6, an STV signal refers to a turn-on signal generated by the timing controller in the LCD display device, which is defined to drive the gate driver in the LCD display device to operate. A GOUT signal refers to an output signal of the gate driver. SOUT refers to an output signal of a source driver in the LCD display device. CLK refers to a clock signal output from the timing controller. VDDIN refers to a power signal provided to the power supply terminal DVDD for power supply. LVDS refers to a display input signal output from a host terminal to the timing controller in the LCD display device, which is defined for use by the timing controller to control the gate driver and the source driver to operate.

Therefore, the embodiments of the present disclosure provide a panel drive circuit applicable to a display device. The panel drive circuit achieves an effective charge bleed-off after turn-off without additionally increasing capacitors, enabling a low cost and a good bleed-off effect. The panel drive circuit is particularly suitable for display products that do not allow to increase the XON duration by increasing capacitors in the periphery.

Figure 7:
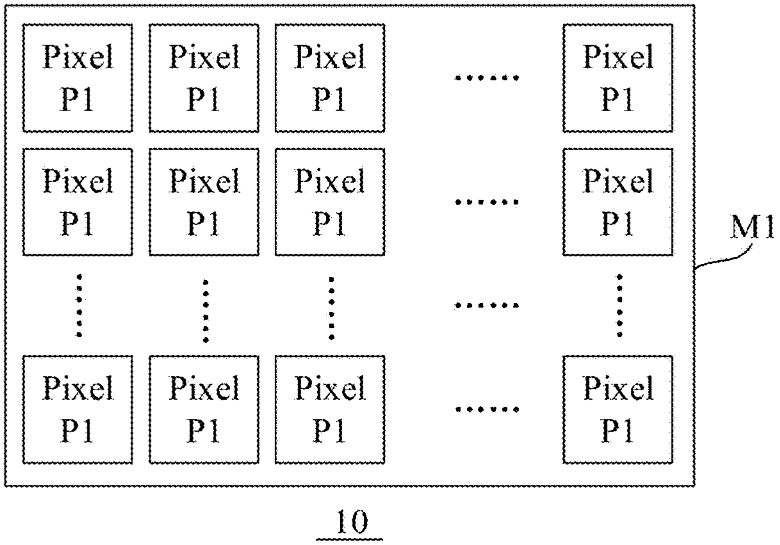
FIG. 7 is a schematic structural diagram of a display device according to some embodiments of the present disclosure.

With reference to FIG. 7, the display device 10 includes: a display panel M1 and a plurality of pixels P1 on the display panel M1, and the pixels P1 include transistors TFTs (not shown in FIG. 7). The structure of the pixels P1 may be seen with reference to FIG. 1, which is not repeated here.

Figure 8:
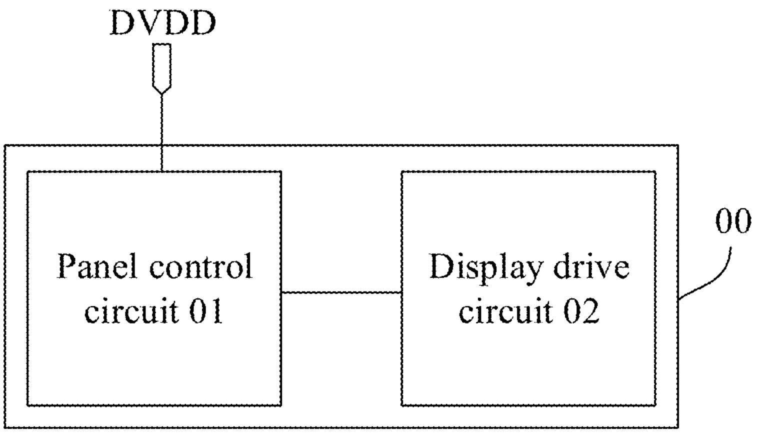
FIG. 8 is a schematic structural diagram of a panel drive circuit according to some embodiments of the present disclosure.

With reference to FIG. 8, the panel drive circuit 00 includes: a panel control circuit 01 and a display drive circuit 02. With reference to FIG. 7 and FIG. 8, the panel control circuit 01 is coupled to a power supply terminal DVDD and the display drive circuit 02, respectively. The display drive circuit 02 is further configured to be coupled to the plurality of pixels P1 (not shown in FIG. 8).

The panel control circuit 01 is configured to: transmit, in the case that the display panel M1 is detected to be turned on, a first display drive signal to the display drive circuit 02 based on a power supply signal of a first potential provided by the power supply terminal DVDD; and transmit, in the case that the display panel M1 is detected to be turned off, at least one target signal of a second display drive signal and a charge bleed-off signal sequentially to the display drive circuit 02 before the potential of the power supply signal drops from the first potential to less than a potential threshold. Sequential transmission means that in the case that the target signal includes the second display drive signal and the charge bleed-off signal, the second display drive signal is transmitted first, and then the charge bleed-off signal is transmitted. In addition, in some embodiments, only the second display drive signal or the charge bleed-off signal is transmitted to the display drive circuit 02.

The display drive circuit 02 is configured to: drive the plurality of pixels P1 to emit light based on the first display drive signal such that the display panel M1 displays a plurality of frames of a first picture; drive the plurality of pixels P1 to emit light based on the second display drive signal such that the display panel M1 displays at least one frame of a second picture; and control the transistors TFTs in the plurality of pixels P1 to be turned on based on the charge bleed-off signal to bleed off charges in the plurality of pixels P1.

The second picture is different from the first picture. For example, the first picture is a normal picture, such as a color picture, to be displayed in the case that the display panel is in a turn-on state. The second picture is a monochrome picture.

The color of a displayed picture on the display panel is generally determined by a display gray level of the pixels P1, and the display gray level of the pixels P1 is determined by a data signal provided by data lines, i.e., by a signal for charging the pixel electrode. Therefore, by transmitting the second display drive signal to the display drive circuit 02 after the display panel M1 is turned off such that the display panel M1 displays at least one frame of the monochrome picture, a voltage difference between the pixel electrode and the common electrode VCOM can become as little as possible before XON by flexibly setting the color of the second picture (for example, setting the color of the second picture to be the same as that corresponding to a display mode of the display panel), i.e., by flexibly setting the magnitude of the potential on the pixel electrode. In other words, a voltage provided to the pixel electrode is quickly pulled to be near a common voltage provided by the common electrode VCOM to reduce a bias voltage between the pixel electrode and the common electrode VCOM, ensuring less residual charges. Later in XON, the charges can be bled off effectively in a short XON duration as the residual charges have been minimized due to display of the second picture, without prolonging the XON duration by increasing capacitors. The operation of the panel control circuit 01 and the display drive circuit 02 cooperating with each other to control the display panel M1 to display at least one frame of the second picture is also referred to as: turn-off frame insertion (in which the frame is referred to as a bleed-off frame) operation.

Compared with the related art, in the embodiments of the present disclosure, the transistors TFTs in the plurality of pixels P1 are controlled to be turned on and the charges in the plurality of pixels P1 are bled off after the display panel M1 is turned off but before the power supply signal provided by the power supply terminal DVDD drops to the potential threshold (which may also be considered that a potential of an XAO signal becomes less than a preset threshold voltage). Therefore, the operation of the panel control circuit 01 and the display drive circuit 02 cooperating with each other to bleed off the charges in the plurality of pixels P1 after the display panel M1 is turned off is also referred to as an advanced XON operation. Later, after the potential of the XAO signal becomes less than the preset threshold voltage, regular XON starts, such that an effective charge bleed-off is ensured. The total XON duration is equal to the advanced XON duration plus the regular XON duration.

Combined with the descriptions of the above embodiments, it can be seen that in the case that the target signal transmitted from the panel control circuit 01 to the display drive circuit 02 includes the second display drive signal and the charge bleed-off signal transmitted sequentially, the display drive circuit 02 performs the turn-off frame insertion operation and then the advanced XON operation after the display panel M1 is turned off. In the case that the target signal transmitted from the panel control circuit 01 to the display drive circuit 02 only includes the second display drive signal, the display drive circuit 02 performs only the turn-off frame insertion operation after the display panel M1 is turned off. In the case that the target signal transmitted from the panel control circuit 01 to the display drive circuit 02 only includes the charge bleed-off signal, the display drive circuit 02 performs only the advanced XON operation after the display panel M1 is turned off.

In summary, the embodiments of the present disclosure provide a panel drive circuit. The panel drive circuit includes a panel control circuit and a display drive circuit. In the case that a display panel is turned off, the panel control circuit transmits at least one of a display drive signal and a charge bleed-off signal sequentially to the display drive circuit before a potential of a power supply signal drops to less than a potential threshold, such that the display drive circuit sequentially performs at least one of controlling the display panel to display a second picture that is monochrome and bleeding off charges in advance. As such, the charge may be bled off in advance before the potential of the power supply signal drops to less than the potential threshold and the regular XON starts, ensuring an effective release of residual charges in pixels.

Figure 9:
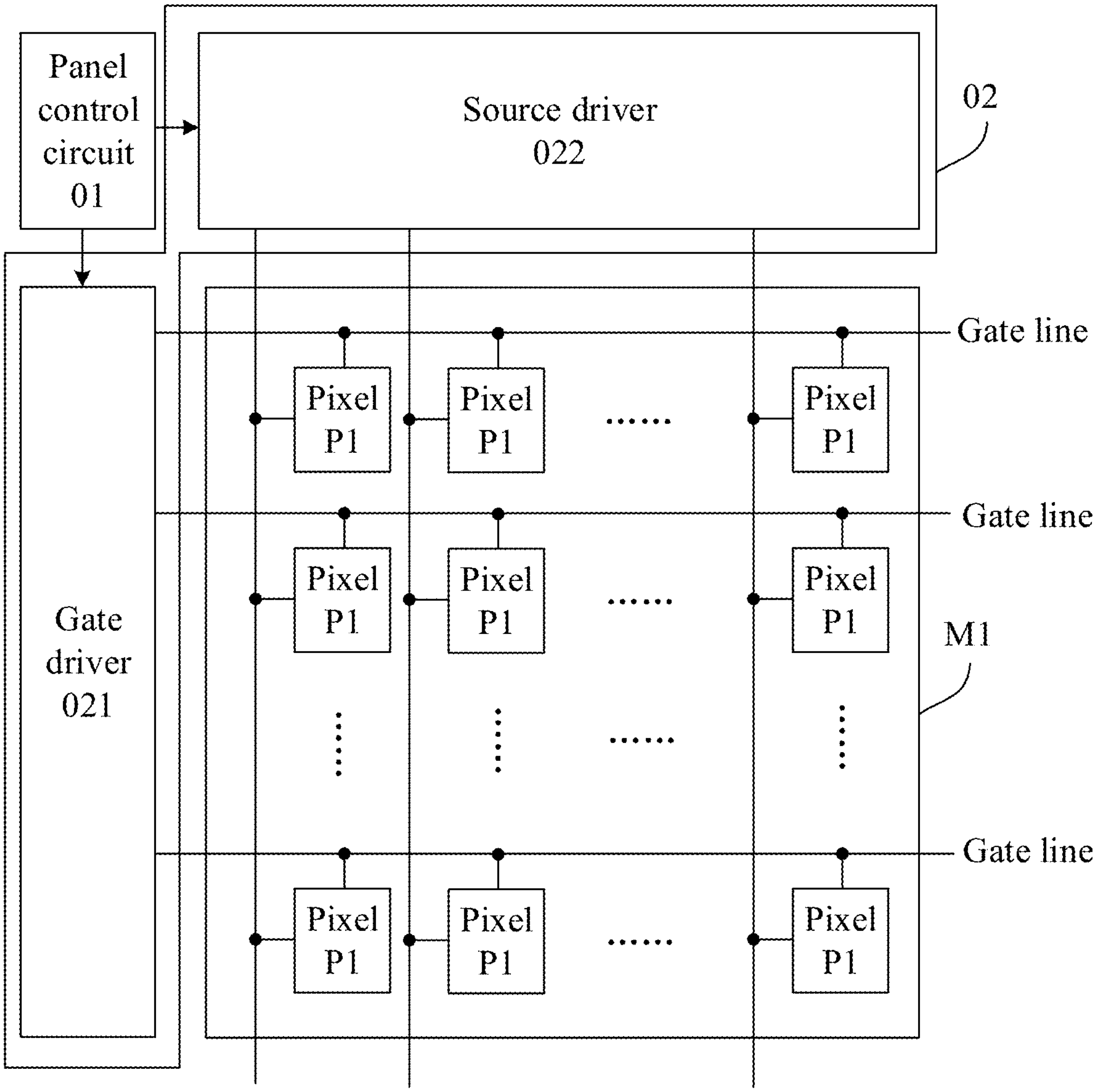
FIG. 9 is a schematic structural diagram of a display drive circuit according to some embodiments of the present disclosure.

FIG. 9 is a schematic structural diagram of yet still another panel drive circuit according to some embodiments of the present disclosure. With reference to FIG. 7 and FIG. 9, it can be seen that the plurality of pixels P1 included in the display panel M1 are arranged in an array, i.e., arranged in rows and columns. The display drive circuit 02 includes a gate driver 021 and a source driver 022.

The gate driver 021 is coupled to the plurality of pixels P1 via a plurality of gate lines G1 and is configured to transmit gate drive signals, i.e., the GOUT signal as described in the above embodiments, to the plurality of pixels P1 row by row based on the first display drive signal and the second display drive signal. In addition, the gate driver 021 transmits a turn-on signal, which is regarded as a gate drive signal of an active potential, to the transistors TFTs in the plurality of pixels P1 based on the charge bleed-off signal.

The source driver 022 is coupled to the plurality of pixels P1 via a plurality of data lines and is configured to transmit data signals, i.e., the SOUT signal as described in the above embodiments, to the plurality of pixels P1 based on the first display drive signal and the second display drive signal.

It should be noted that the data signals transmitted from the source driver 022 to the plurality of pixels P1 based on the first display drive signal is different from the data signals transmitted to the plurality of pixels P1 based on the second display drive signal, such that it is ensured that the displayed first picture and second picture are different. The plurality of pixels P1 are configured to emit light in response to the gate drive signals and the data signals, and the transistors TFTs in the plurality of pixels P1 are configured to be turned on in response to the turn-on signal.

In some embodiments, the display device generally includes a host terminal and a backlight. The host terminal is coupled to the panel control circuit 01 and the backlight as described in the embodiments of the present disclosure, respectively.

Figure 10:
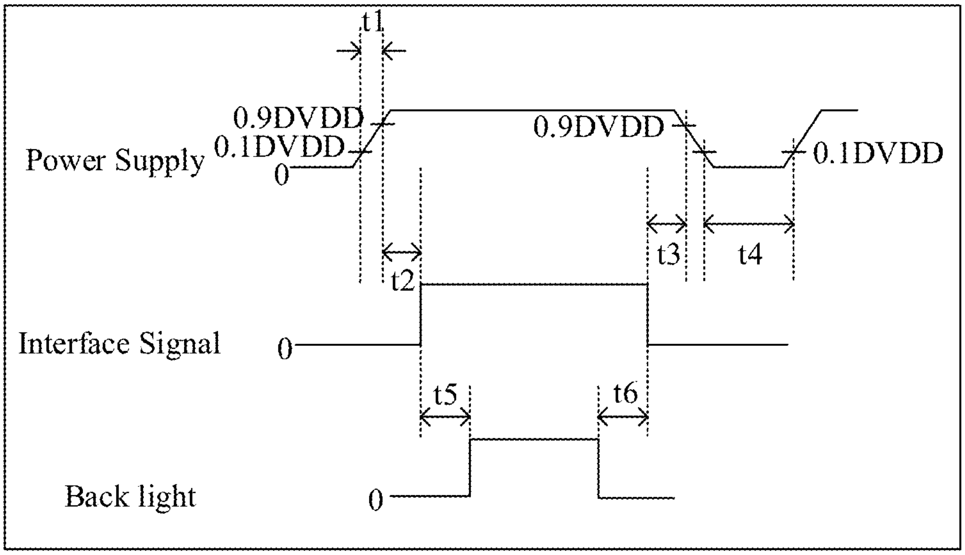
FIG. 10 is a timing diagram including a power supply, an input signal, and a backlight signal according to some embodiments of the present disclosure.

The host terminal is configured to transmit a display input signal (Interface Signal) to the panel control circuit 01 based on a pending picture. For example, the display input signal is low-voltage differential signaling (LVDS) in the timing diagram shown in FIG. 6. The panel control circuit 01 is configured to generate the first display drive signal based on the display input signal so as to control the display drive circuit 02 to reliably drive the display panel M1 to display the first picture. The first picture is a picture generated based on the display input signal. In addition, the host terminal is further configured to provide a backlight signal to the backlight to turn the backlight on or off.

Where a high potential indicates to transmit a signal and a low potential indicates to stop the transmission, for example, it can be seen from the timing diagram shown in FIG. 10 that, in the case that the display panel has been turned on and in an operating state, a power supply transmits the power supply signal to the power supply terminal DVDD to charge the power supply terminal DVDD. The host terminal transmits the display input signal to the panel control circuit 01 to drive the display panel M1 to display a picture normally. In addition, the host terminal provides the backlight signal to the backlight to turn the backlight on, such that the display panel M1 displays normally. In the case that the display panel has been turned off and in a non-operating state, the power supply stops the transmission of the power supply signal to the power supply terminal DVDD, i.e., stop supplying power to the power supply terminal DVDD. The host terminal stops the transmission of the display input signal to the panel control circuit 01. In addition, the host terminal stops providing the backlight signal to the backlight to turn the backlight off.

In addition, with reference to FIG. 10, it can be further seen that in the case that the display panel M1 is changed to a turn-on state from a turn-off state, the power supply first charges the power supply terminal DVDD, and after the power supply terminal DVDD is charged from 0.1 V to 0.9 V (see the stage t1 shown in FIG. 10), the display panel M1 starts to prepare for displaying. After a stage t2, the host terminal starts to transmit the display input signal to the panel control circuit 01. Next, after a stage t5, the host terminal starts to provide the backlight signal to the backlight to turn the backlight on. In this case, the display panel M1 starts a normal display of the picture. In the case that the display panel is changed to the turn-off state from the turn-on state, the host terminal first stops providing the back light to the backlight, and after a stage t6, the host terminal stops the transmission of the display input signal to the panel control circuit 01. Then, the power supply stops supplying power to the power supply terminal DVDD. After a stage t3, the potential of the power supply terminal DVDD decreases to 0.9DVDD (i.e., the potential threshold), and then the regular XON operation starts until the potential of the power supply terminal DVDD decreases to 0.1DVDD, and XON ends. A stage t4 shows the power supplied from the power supply to the power supply terminal DVDD from this turn-off to a next turn-on. In other words, the power supply first starts to supply power to the power supply terminal DVDD in the case that the display panel M1 is turned on. Then, the host terminal starts to provide the input power signal. Finally, the host terminal starts to control the backlight to be turned on. The host terminal first controls the backlight to turn off in the case that the display panel M1 is turned off. Then, the host terminal stops providing the display input signal. Finally, the power supply stops supplying power to the power supply terminal DVDD.

It should be noted that, even in the case of abnormal power failure, due to the presence of the capacitor on a printed circuit board assembly (PCBA), the power signal provided by the power supply to the power supply terminal DVDD is slowly decreased, such that the panel control circuit 01 still operates for a period. However, the backlight is turned off immediately after the voltage decreases slightly below the voltage required for turning on the backlight, and thus stops operation far before the panel control circuit. The panel control circuit 01 includes at least a timing controller (TCON), and the panel control circuit 01 mentioned herein may refer to the timing controller TCON included therein.

With reference to FIG. 10, it can be seen that a common practice is to start XON after the stage t3, which is referred to as the regular XON. In the embodiments of the present disclosure, however, the time before the regular XON can be fully utilized to bleed off the charges in advance. For example, the turn-off frame insertion operation and/or the advanced XON operation may be performed at the stage t3 or the stage t6. After the stage t3, the regular XON starts, such that an effective charge bleed-off is ensured.

In some embodiments, in the case that a display mode of the display panel M1 is a normal black display mode, the second picture is a black picture; and in the case that the display mode of the display panel M1 is a normal white display mode, the second picture is a white picture. The normal black display mode is commonly used in in-plane-switching (IPS) or advanced super dimension switch (ADS) display panels. The normal white display mode is commonly used in twisted nematic (TN) display panels.

Figure 11:
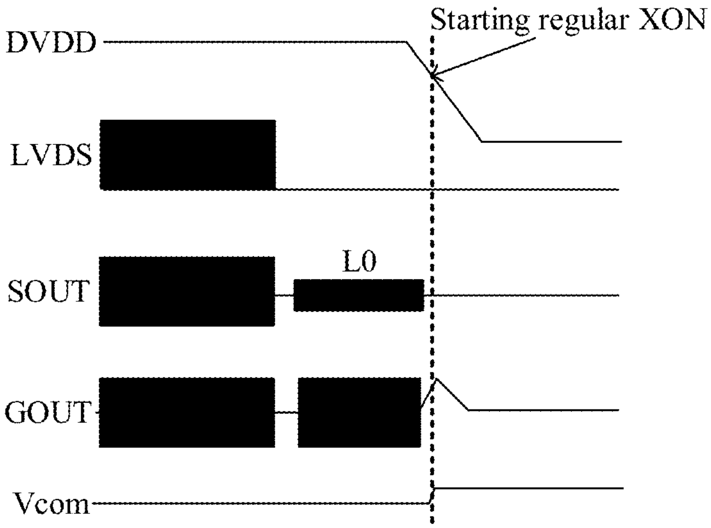
FIG. 11 is a signal timing diagram for turn-off frame insertion according to some embodiments of the present disclosure.

The data signals corresponding to the black picture is L0, and the data signals corresponding to the white picture is L255. Exemplarily, where the second picture is the black picture, for example, FIG. 11 shows a signal timing diagram. The display input signal LVDS, the power supply signal provided by the power supply terminal DVDD, the gate drive signals GOUT output from the gate driver 021, the source drive signal SOUT output from the source driver 022, and the common voltage on the common electrode VCOM are shown. With reference to FIG. 11, it can be seen that before the regular XON starts but after the output of the display input signal LVDS is stopped, the panel control circuit 01 transmits the second display drive signal to the display drive circuit 02, such that the gate driver 021 included in the display drive circuit 02 continues to transmit the gate drive signals and the source driver 022 included in the display drive circuit 02 continues to transmit the data signals, and the transmitted data signal is L0, achieving a frame-interpolated display of the black picture. The turn-off frame insertion operation stops before the regular XON starts.

In some embodiments of the present disclosure, the display drive circuit 02 is configured to: drive the plurality of pixels P1 to emit light based on the second display drive signal such that the display panel M1 displays an even number of frames of the second picture. In addition, every two adjacent frames of the second picture have opposite polarities, such that a polarity balance is ensured, which further ensures a good display effect of the display panel M1.

The opposite polarities mean that, for each of the pixels P1, in two adjacent frames, the voltage differences between the pixel electrode and the common electrode VCOM included in the pixel P1 are equal, but the potential on the pixel electrode in one of the frames is greater than the common voltage on the common electrode VCOM (which is referred to as a positive polarity), and the potential on the pixel electrode in the other one of the frames is less than the common voltage on the common electrode VCOM (which is referred to as a negative polarity).

Combined with the descriptions of the above embodiments, it can be seen that as the transistors TFTs in the pixels P1 transmit the data signals provided by the data lines to the pixel electrode to charge the pixel electrode, the potential on the pixel electrode is equivalent to the potential of the data signals. That is, in two adjacent frames, the data lines coupled to each of the pixels P1 transmit data signals of different potentials, where the potential of the data signals transmitted in one of the frames is greater than the common voltage on the common electrode VCOM, and the potential of the data signals transmitted in the other one of the frames is greater than the common voltage on the common electrode VCOM, such that the display panel is ensured to reliably display the second picture.

Figure 12:
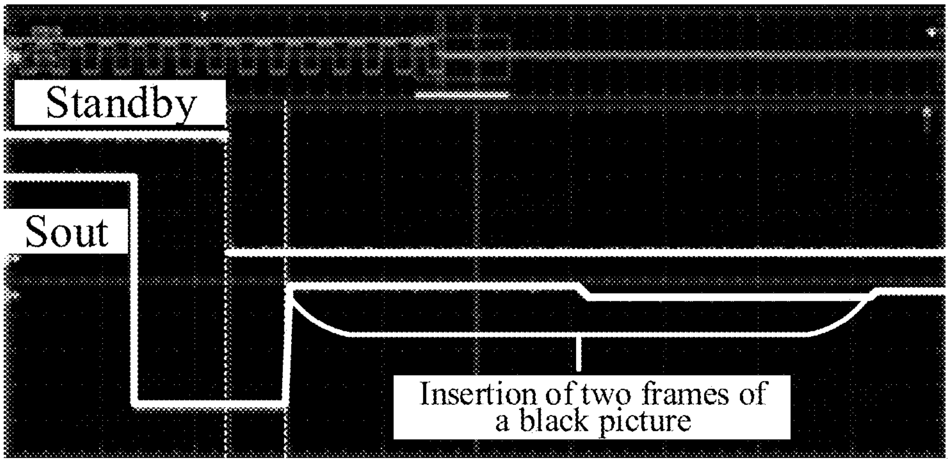
FIG. 12 is a signal simulation diagram for turn-off frame insertion according to some embodiments of the present disclosure.

For example, the display drive circuit 02 is configured to drive the plurality of pixels P1 to emit light based on the second display drive signal such that the display panel M1 displays two frames of the second picture, which exactly have the opposite polarities. FIG. 12 shows a simulation diagram for turn-off frame insertion, with two frames of the black picture being interpolated, for example.

Combined with the descriptions of the above embodiments, it can be seen that the residual charges in the pixels P1 can be minimized after the turn-off frame insertion. Later, the regular XON starts, such that an effective charge bleed-off is achieved. On this basis, the charges can be fully bled off by controlling the duration of the regular XON through adding less or no capacitors. Exemplarily, in a 21.45-inch ADS display product, for example, after two frames of the black picture are interpolated upon turn-off, the residual charges in the pixels are minimized, and the potential of the data signals L0 driving the display of the black picture is substantially close to a potential of a signal provided by a ground terminal GND. Therefore, the turn-off frame insertion operation is particularly suitable for a scenario where the common voltage on the common electrode VCOM is near 0 V.

In some embodiments, as described in the above embodiments, the panel control circuit 01 is further configured to be coupled to the host terminal, and to receive a control signal transmitted from the host terminal and determine a work state of the display panel M1 based on the control signal. The control signal being at the first potential indicates that the display panel M1 is in the turn-on state, the control signal being at a second potential indicates that the display panel M1 is in the turn-off state, and in the case that the display panel M1 is turned off, a potential of the control signal changes from the first potential to the second potential before the potential of the power supply signal starts to drop. The panel control circuit 01 is further configured to transmit the target signal to the display drive circuit 02 in the case that the display panel M1 is determined to be turned off based on the control signal.

That is, in the embodiments of the present disclosure, before the potential of the power supply signal becomes less than the potential threshold, the panel control circuit 01 controls the display drive circuit 02 to perform the turn-off frame insertion operation and/or the advanced XON operation immediately in the case that the display panel is determined to be turned off based on the control signal provided by the host terminal.

As an optional implementation, the control signal is the display input signal LVDS transmitted from the host terminal to the panel control circuit 01. That is, with reference to FIG. 10, the panel control circuit 01 can directly trigger XON based on the timing of the input signal LVDS without waiting for a potential decrease of the power supply signal provided by the power supply terminal DVDD. Once the host terminal stops providing the display input signal, the panel control circuit 01 immediately transmits the charge bleed-off signal to the display drive circuit 02, such that the display drive circuit 02 controls the transistors TFTs in all of the pixels P1 to be turned on to bleed off the charges in advance. That is, with reference to FIG. 10 and FIG. 13, the stage t3 can be fully utilized for supplementary actions to achieve an advanced charge bleed-off. Later, the regular XON starts, where the charges are further bled off, which finally ensures that the charges stored in the pixels are fully bled off.

Figure 13:
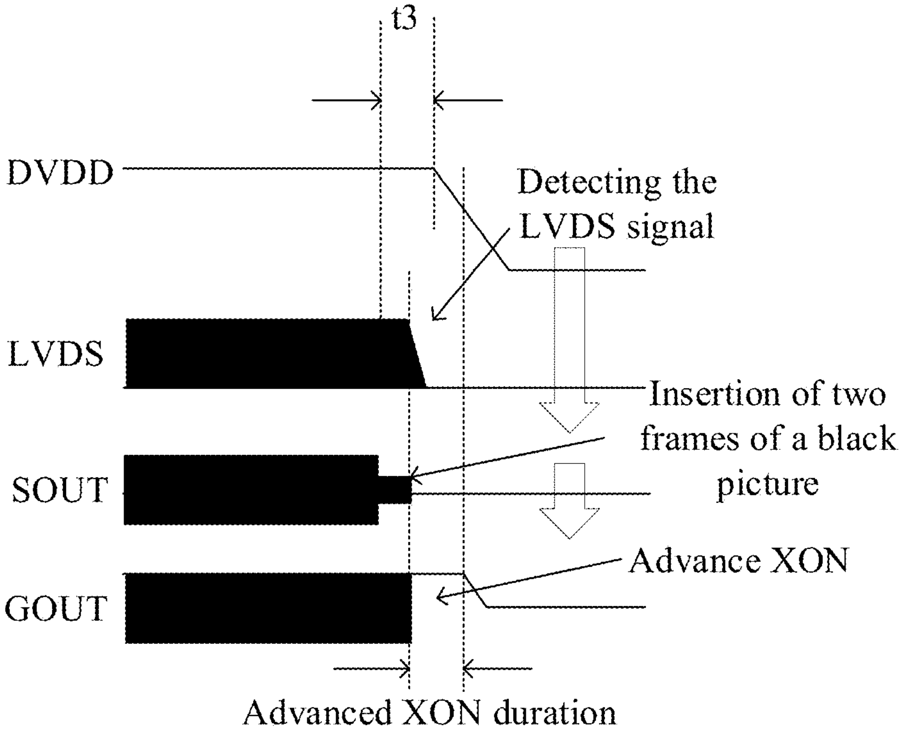
FIG. 13 is a timing diagram for advanced charge bleed-off and turn-off frame insertion according to some embodiments of the present disclosure.

In some embodiments, with reference to FIG. 11 and FIG. 13, before the advanced XON, the turn-off frame insertion operation is first performed, such as interpolating two frames of the black picture as shown in connection with FIG. 11. FIG. 13 further shows the power supply signal provided by the power supply terminal DVDD, the display input signal LVDS, the gate drive signals GOUT transmitted from the gate driver 021, and the data signals SOUT transmitted from the source driver 022, respectively.

As another optional implementation: the control signal is a signal generated by the host terminal based on the detected work state of the display panel M1, which is also referred to as a Standby signal. That is, with reference to FIG. 10, the panel control circuit 01 directly triggers XON based on the timing of the Standby signal without waiting for a potential decrease of the power supply signal provided by the power supply terminal DVDD. Once the Standby signal is powered down, the panel control circuit 01 immediately transmits the charge bleed-off signal to the display drive circuit 02, such that the display drive circuit 02 controls the transistors TFTs in all of the pixels P1 to be turned on to bleed off the charges in advance. Later, the regular XON starts, such that the total XON duration is effectively prolonged, ensuring the residual charges in the pixel P1 to be effectively bled off.

Figure 14:
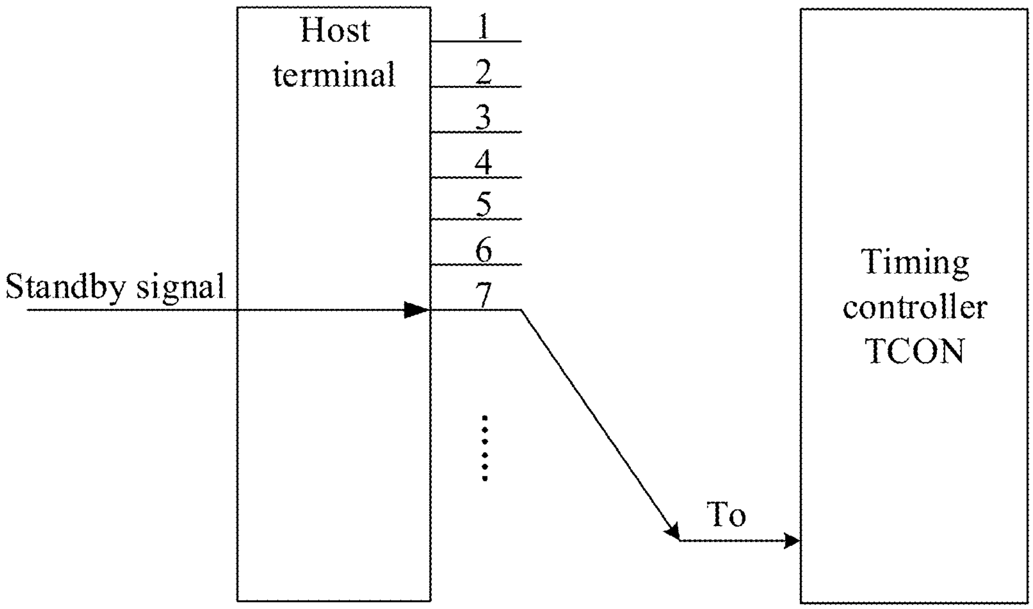
FIG. 14 is a schematic diagram illustrating a host terminal transmitting a control signal to a timing controller according to some embodiments of the present disclosure.

For example, with reference to FIG. 14, a schematic diagram of a connection between the host terminal and the timing controller TCON included in the panel control circuit 01 in a 21.45-inch display device is shown. With reference to FIG. 14, it can be seen that the host terminal actively generates the Standby signal and transmits the Standby signal to the timing controller TCON via a corresponding pin to indicate whether the display panel M1 is turned off.

Figure 15:
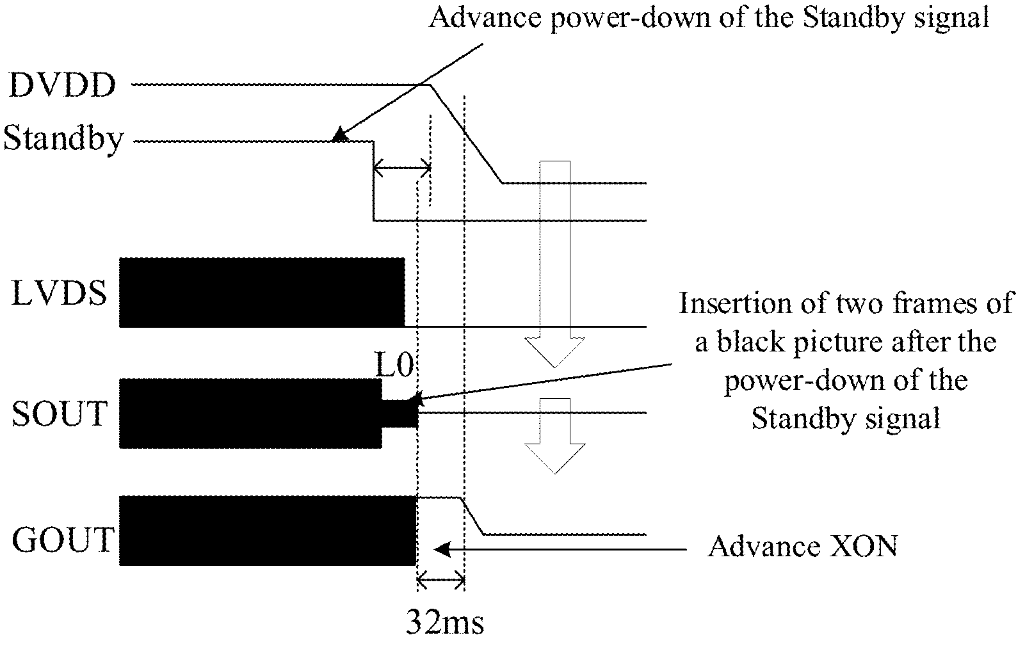
FIG. 15 is another timing diagram for advanced charge bleed-off and turn-off frame insertion according to some embodiments of the present disclosure.
Figure 16:
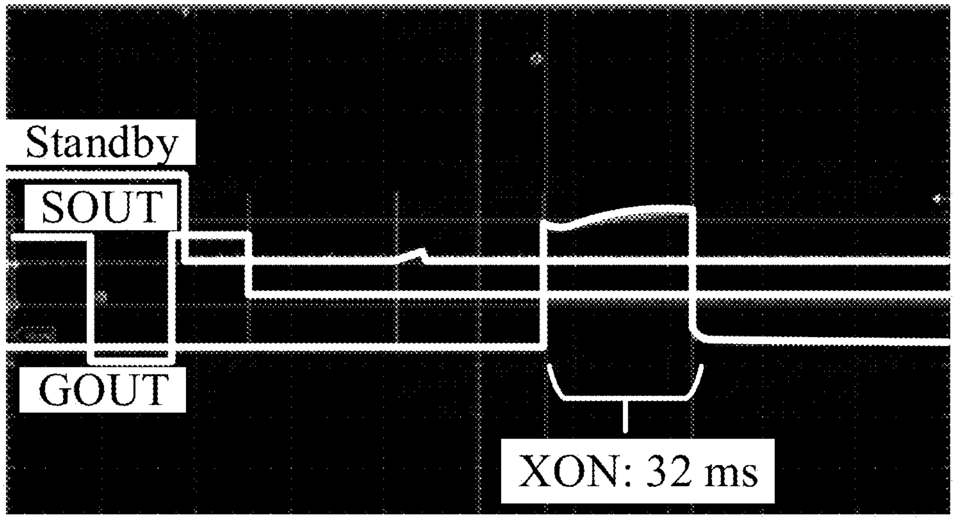
FIG. 16 is a simulation diagram of the timing diagram of FIG. 15.

FIG. 15 shows a signal timing diagram including the Standby signal. With reference to FIG. 11 and FIG. 15, it can be seen that the transition of the Standby signal from the high potential to the low potential occurs before the power supply terminal DVDD is powered down, i.e., the Standby signal is powered down in advance. Before starting the advanced XON based on the Standby signal, the turn-off frame insertion operation is first performed, such as interpolating two frames of the black picture as shown in connection with FIG. 11. Then the advanced XON starts, and the duration of the advanced XON may be about 32 ms. FIG. 15 further shows the power supply signal provided by the power supply terminal DVDD, the display input signal LVDS, the gate drive signals GOUT transmitted from the gate driver 021, and the data signals SOUT transmitted from the source driver 022, respectively. With FIG. 15 as an example, FIG. 16 shows a simulation diagram of performing turn-off frame insertion and advanced XON based on the Standby signal.

In some embodiments, various methods are available for the host terminal to detect the work state of the display panel M1. For example, the host terminal determines that the display panel M1 is turned off based on a received turn-off instruction, where the turn-off instruction may be generated by manually triggering the display panel by a user or by using voice control by the user, which is not limited in the embodiments of the present disclosure.

As still another optional implementation, the panel control circuit 01 is further configured to detect a light emission state of the backlight and determine the work state of the display panel M1 based on the light emission state of the backlight. The backlight being in a light-emitting state indicates that the display panel M1 is in the turn-on state, the backlight being in a non-light-emitting state indicates that the display panel M1 is in the turn-off state, and in the case that the display panel M1 is turned off, the backlight switches from the light-emitting state to the non-light-emitting state before the potential of the power supply signal starts to drop. On this basis, it is determined that the Standby signal or the XAO signal described in the above embodiments can be generated by the panel control circuit 01 based on the light emission state of the backlight, and accordingly, the host terminal does not have to transmit the Standby signal to the panel control circuit 01.

In addition, the panel control circuit 01 is further configured to transmit the target signal to the display drive circuit 02 in the case that the display panel M1 is determined to be turned off based on the light emission state of the backlight.

That is, in the embodiments of the present disclosure, before the potential of the power supply signal becomes less than the potential threshold, the panel control circuit 01 controls the display drive circuit 02 to perform the turn-off frame insertion operation and/or the advanced XON operation immediately upon detecting that the backlight is turned off. Combined with the descriptions of the above embodiments, it can be seen that after the display panel is turned off, the backlight is turned off first, such that an effective charge bleed-off is further ensured.

Figure 17:
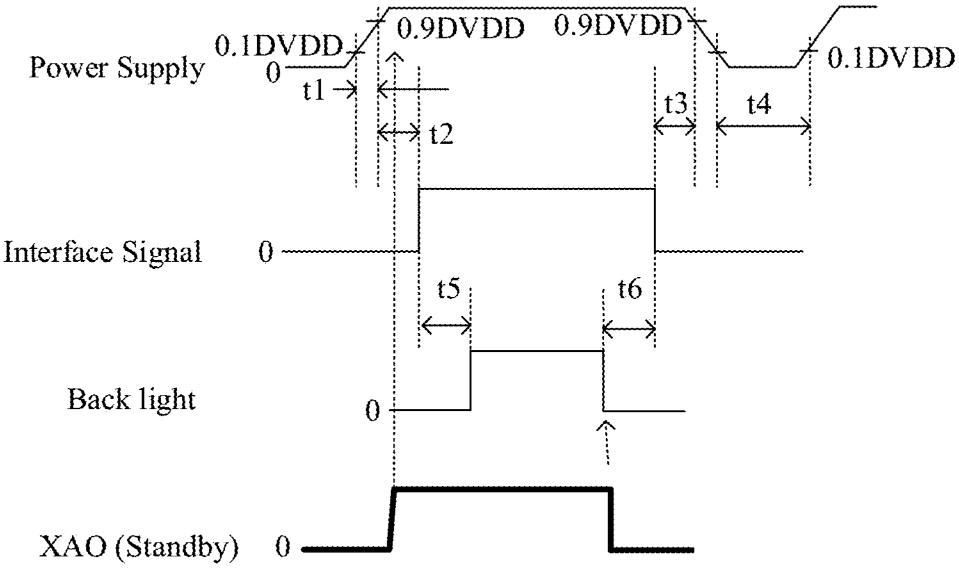
FIG. 17 is a timing diagram including a power supply, an input signal, a backlight signal, and an XAO signal according to some embodiments of the present disclosure.

Exemplarily, with reference to FIG. 10 and FIG. 17, once the backlight is turned off, i.e., the host terminal stops providing the backlight signal to the backlight, the Standby signal or the XAO signal immediately transitions from the high potential to the low potential to power down. In this case, the panel control circuit 01 directly transmits the target signal to the display drive circuit 02 such that the display drive circuit 02 performs the turn-off frame insertion operation and/or the advanced XON operation.

Figure 18:
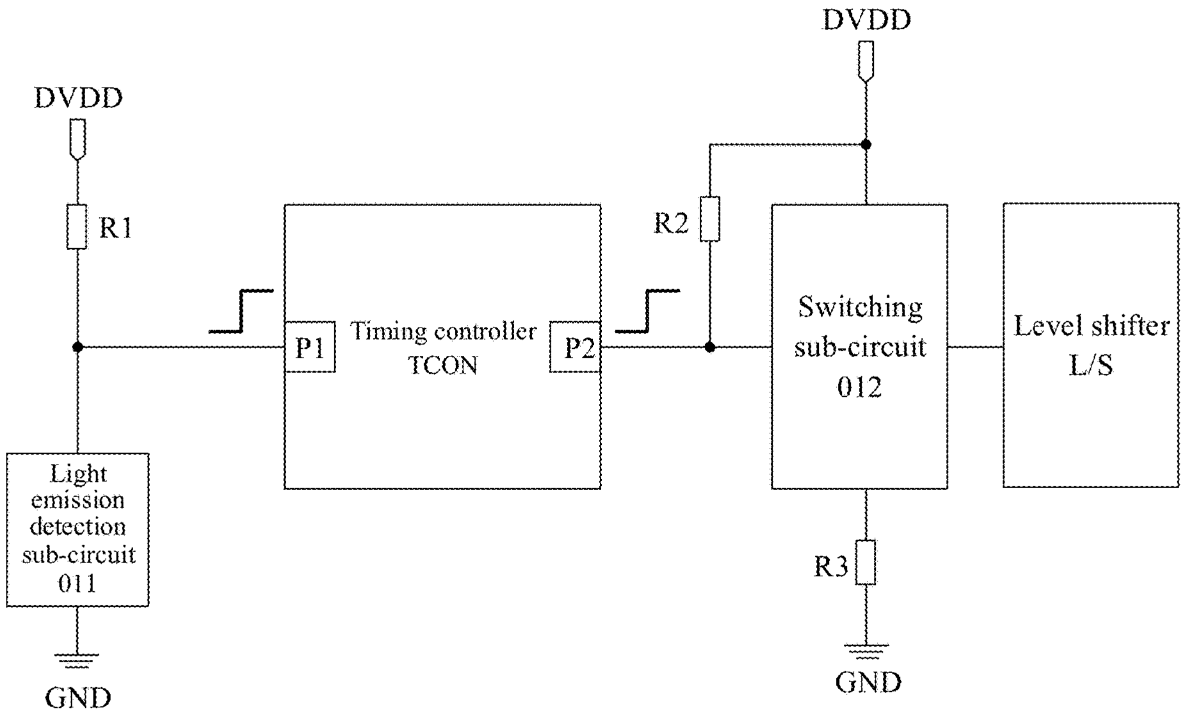
FIG. 18 is a schematic structural diagram of a panel control circuit according to some embodiments of the present disclosure.

In some embodiments, with reference to FIG. 18, the panel control circuit 01 further includes, in addition to the timing controller TCON: a light emission detection sub-circuit 011, a level shifter L/S, and a switching sub-circuit 012.

The light emission detection sub-circuit 011 is disposed at a side of the backlight and is coupled to a pull-down power terminal (e.g., the ground terminal GND) and an input interface P1 of the timing controller TCON, respectively. The light emission detection sub-circuit 011 is configured to control the pull-down power terminal GND to connect to the input interface P1 of the timing controller TCON in the case that the backlight is detected to be light-emitting (i.e., the display panel is turned on). In this case, a pull-down power signal provided by the pull-down power terminal GND is transmitted to the input interface P1 of the timing controller TCON. The pull-down power terminal GND is controlled to disconnect from the input interface P1 of the timing controller TCON in the case that the backlight is detected to be non-light-emitting (i.e., the display panel is turned off).

The input interface P1 of the timing controller TCON is further coupled to the power supply terminal DVDD, and an output interface P2 of the timing controller TCON is coupled to a control terminal of the switching sub-circuit 012. The timing controller TCON is configured to transmit a turn-on signal to the control terminal of the switching sub-circuit 012 based on the pull-down power signal transmitted from the pull-down power terminal GND to the input interface P1, and transmit a turn-off signal to the control terminal of the switching sub-circuit 012 based on the power supply signal transmitted from the power supply terminal DVDD to the input interface. It should be noted that, in the case that the light emission detection sub-circuit 011 controls the pull-down power terminal GND to disconnect from the input interface P1 of the timing controller TCON, the power supply signal provided by the power supply terminal DVDD is reliably transmitted to the input interface P1 of the timing controller TCON.

An input terminal of the switching sub-circuit 012 is coupled to the power supply terminal DVDD, and an output terminal of the switching sub-circuit 012 is coupled to the pull-down power terminal GND and the level shifter L/S, respectively. The switching sub-circuit 012 is configured to control the power supply terminal DVDD to connect to the level shifter L/S in response to the turn-on signal, and in this case, the power supply signal provided by the power supply terminal DVDD is transmitted to the level shifter L/S. In addition, the switching sub-circuit 012 is configured to control the pull-down power terminal GND to connect to the level shifter L/S in response to the turn-off signal. In this case, the pull-down power signal provided by the pull-down power terminal GND is transmitted to the level shifter L/S.

The level shifter L/S is further coupled to the display drive circuit 02 (not shown). The level shifter L/S is configured to transmit the target signal, i.e., the second display drive signal and/or the charge bleed-off signal, to the display drive circuit 02 based on the pull-down power signal transmitted from the pull-down power terminal GND, achieving the purpose of turn-off frame insertion and/or advanced charge bleed-off. In addition, the level shifter L/S transmits the first display drive signal to the display drive circuit 02 based on the power supply signal transmitted from the power supply terminal DVDD, such that the display drive circuit 02 reliably controls the display panel M1 to display the first picture normally based on the first display drive signal.

That is, in the embodiments of the present disclosure, once the light emission detection sub-circuit 011 detects that the backlight stops emitting light, the Standby signal or the XAO signal of a low potential is transmitted to the level shifter L/S immediately to control the level shifter L/S to pull up the potentials of the gate drive signals transmitted from the gate driver 021, such that all of the TFTs in the pixels are turned on, achieving an advanced charge bleed-off. In addition, as described in the above embodiments, the Standby signal or the XAO signal of the low potential may also control the level shifter L/S to transmit the second display drive signal to the display drive circuit 02 to start the turn-off frame insertion operation.

Figure 19:
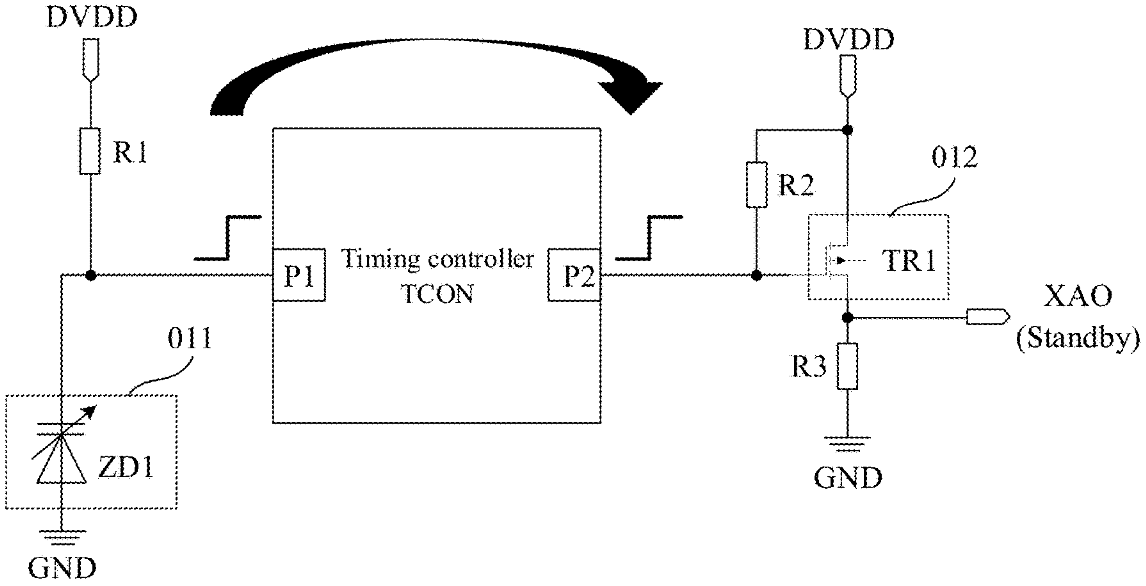
FIG. 19 is a schematic structural diagram of another panel control circuit according to some embodiments of the present disclosure.

FIG. 19 shows a schematic structural diagram of another panel control circuit. As shown in FIG. 19, the light emission detection sub-circuit 011 is a photoelectric conversion diode ZD1. The switching sub-circuit 012 includes a switching transistor TR1.

An input terminal of the photoelectric conversion diode ZD1 is coupled to the pull-down power terminal GND, and an output terminal of the photoelectric conversion diode ZD1 is coupled to the input interface P1 of the timing controller TCON. In the case that the backlight is turned on, the photoelectric conversion diode ZD1 is turned on to control the pull-down power terminal GND to connect to the input interface P1 of the timing controller TCON. In the case that the backlight is turned off, the photoelectric conversion diode ZD1 is turned off to control the pull-down power terminal GND to disconnect from the input interface P1 of the timing controller TCON.

The output interface P2 of the timing controller TCON is coupled to a gate of the switching transistor TR1, a first electrode of the switching transistor TR1 is coupled to the power supply terminal DVDD, and a second electrode of the switching transistor TR1 is coupled to the pull-down power terminal GND. That is, the gate of the switching transistor TR1 is the control terminal of the switching sub-circuit 012, the first electrode of the switching transistor TR1 is the input terminal of the switching sub-circuit 012, and the second electrode of the switching transistor TR1 is the output terminal of the switching sub-circuit 012. For the first electrode and the second electrode of the switching transistor TR1, one electrode is a source and the other electrode is a drain.

In some embodiments of the present disclosure, the switching transistor TR1 is a P-type transistor. For the P-type transistor, the turn-on signal is at a low potential and the turn-off signal is at a high potential. In addition, in some other embodiments, the switching transistor TR1 is an N-type transistor. For the N-type transistor, the turn-on signal is at a high potential and the turn-off signal is at a low potential.

With continued reference to FIG. 18 and FIG. 19, it can be seen that the panel control circuit 01 further includes: a first resistor R1 connected between the power supply terminal DVDD and the input interface P1 of the timing controller TCON in series; a second resistor R2 connected between the power supply terminal DVDD and the output interface P2 of the timing controller TCON in series; and a third resistor R3 connected between the pull-down power terminal GND and the output terminal of the switching sub-circuit 012 in series.

The input interface P1 of the timing controller TCON is generally active for rising edge triggering. On this basis, with reference to FIG. 19, the operation principles of the panel control circuit 01 are described as follows:

With reference to FIG. 17, after the display panel is turned on, the power supply starts first in timing to charge the power supply terminal DVDD. After the power supply terminal DVDD is prepared (i.e., the potential of the supplied power supply signal reaches 0.9DVDD), the timing controller TCON completes initialization. In this case, the output interface P2 of the timing controller TCON outputs the turn-on signal of a low potential, and accordingly, the switching transistor TR1 is turned on. The power supply signal of a high potential provided by the power supply terminal DVDD is transmitted to the second electrode of the switching transistor TR1 via the first electrode of the switching transistor TR1. That is, the potential of the Standby signal or the XAO signal is high in this case. The level shifter L/S controls the display drive circuit 02 to start operation based on the Standby signal or the XAO signal of the high potential, such that the display panel is normally turned on.

With continued reference to FIG. 17, after the stage t2 and the stage t5, the host terminal provides the backlight signal to the backlight to control the backlight to be turned on. In this case, the photoelectric conversion diode ZD1 is turned on, such that the input interface P1 of the timing controller TCON is reliably coupled to the pull-down power terminal GND. Accordingly, the pull-down power signal of a low potential provided by the pull-down power terminal GND is transmitted to the input interface P1 of the timing controller TCON. As the input interface P1 of the timing controller TCON is active for rising edge triggering, the timing controller TCON does not perform any processing in this case, and the output interface P2 thereof still outputs the turn-on signal of the low potential. Accordingly, the switching transistor TR1 remains in the turn-on state, the potential of the Standby signal or the XAO signal remains high, and the display panel displays normally.

With continued reference to FIG. 17, in the case that the display panel is turned off, the backlight is turned off first as compared to the power supply and the display input signal LVDS. In this case, the photoelectric conversion diode ZD1 is turned off, such that the input interface P1 of the timing controller TCON decouples from the pull-down power terminal GND. Accordingly, the power supply signal of the high potential provided by the power supply terminal DVDD is transmitted to the input interface P1 of the timing controller TCON, i.e., the input interface P1 of the timing controller TCON is pulled up from the previous low potential to the high potential. As the input interface P1 of the timing controller TCON is active for rising edge trigger, the output interface P2 of the timing controller TCON correspondingly outputs the turn-off signal of a high potential, such that the switching transistor TR1 is turned off. The second electrode of the switching transistor TR1 is pulled down to the pull-down power terminal GND by the third resistor R3, such that the potential of the Standby signal or the XAO signal output from the second electrode of the switching transistor TR1 transitions to the pull-down power signal of the low potential. The level shifter L/S is thereby triggered to start XON in advance.

Combined with the descriptions of the above embodiments, it can be seen that the panel control circuit 01 described in the embodiments of the present disclosure is further configured to: transmit, in the case that the display panel M1 is detected to be turned off, the charge bleed-off signal to the display drive circuit 02 before the potential of the power supply signal drops from the first potential to less than the potential threshold but greater than the second potential. That is, after turn-off frame insertion and/or advanced XON, the regular XON starts as well, such that an effective charge bleed-off is ensured.

Combined with the descriptions of the above embodiments, it can be seen that the embodiments of the present disclosure provide various control timings that may be combined arbitrarily to achieve an effective charge bleed-off. For example, with reference to FIG. 11, a timing for turn-off frame insertion is shown. With reference to FIG. 13, a timing of performing turn-off frame insertion and advanced XON based on the display input signal is shown. With reference to FIG. 15, a timing of performing turn-off frame insertion and advanced XON based on the Standby signal. The Standby signal may be generated by the host terminal and transmitted to the panel control circuit 01, or may be generated directly by the panel control circuit 01 detecting the work state of the backlight. The solutions described in the embodiments of the present disclosure are particularly suitable for a special case where the regular XON duration cannot be extended by increasing capacitors. It has been tested that, in a 21.45-inch vertical screen display product manufactured by using the COG packaging technology, the charges can be effectively bled off by using turn-off frame insertion and advanced XON, such that the problem of flicker caused by the residue charges is solved.

In summary, the embodiments of the present disclosure provide a panel drive circuit. The panel drive circuit includes a panel control circuit and a display drive circuit. The panel drive circuit includes a panel control circuit and a display drive circuit. In the case that a display panel is turned off, the panel control circuit transmits at least one of a display drive signal and a charge bleed-off signal sequentially to the display drive circuit before a potential of a power supply signal drops to less than a potential threshold, such that the display drive circuit sequentially performs at least one of controlling the display panel to display a second picture that is monochrome and bleeding off charges in advance. As such, the charge may be bled off in advance before the potential of the power supply signal drops to less than the potential threshold and the regular XON starts, ensuring an effective release of residual charges in pixels.

Figure 20:
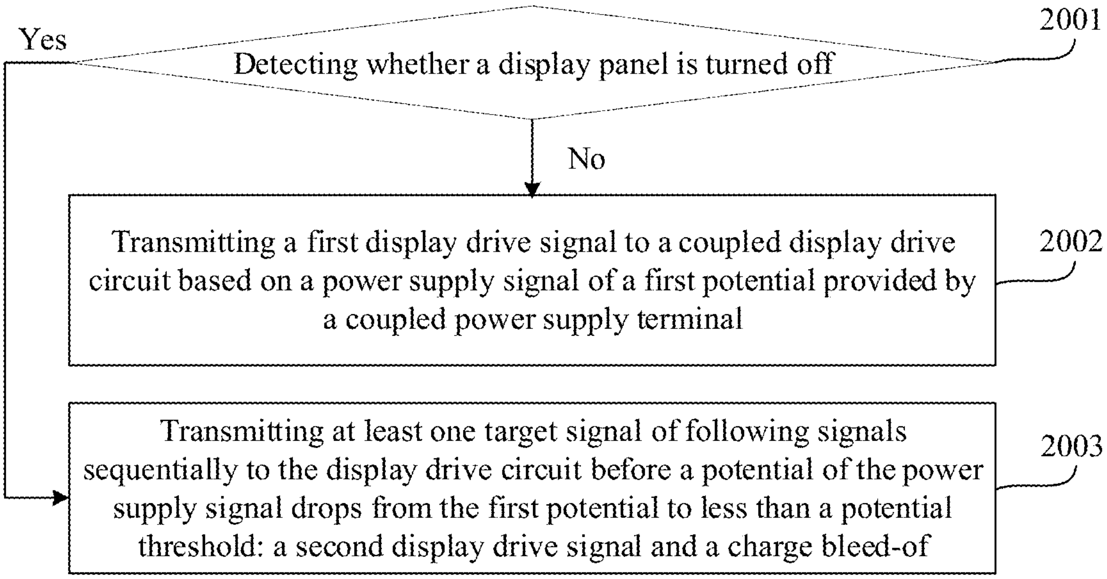
FIG. 20 is a flowchart of a method for charge bleed-off according to some embodiments of the present disclosure.

FIG. 20 is a flowchart of a method for charge bleed-off according to some embodiments of the present disclosure. The method is applicable to the panel control circuit 01 included in the panel drive circuit as shown in the above drawings. As shown in FIG. 20, the method includes:

In step 2001, a display panel is detected for turn-off.

In step 2002, in the case that the display panel is detected to be turned on, a first display drive signal is transmitted to a coupled display drive circuit based on a power supply signal of a first potential provided by a coupled power supply terminal.

In step 2003, in the case that the display panel is detected to be turned off, at least one target signal of a second display drive signal and a charge bleed-off signal is transmitted sequentially to the display drive circuit before the potential of the power supply signal drops from the first potential to less than a potential threshold.

The first display drive signal is used to instruct the display drive circuit to drive a plurality of pixels to emit light such that the display panel displays a plurality of frames of a first picture, and the second display drive signal is used to instruct the display drive circuit to drive the plurality of pixels to emit light such that the display panel displays at least one frame of a second picture. The charge bleed-off signal is used to instruct the display drive circuit to control transistors in the plurality of pixels to be turned on to bleed off charges in the plurality of pixels. The second picture is different from the first picture, and the second picture is a monochrome picture.

In summary, the embodiments of the present disclosure provide a method for charge bleed-off. In the method, in the case that a display panel is turned off, a panel control circuit transmits at least one of a display drive signal and a charge bleed-off signal sequentially to a display drive circuit before a potential of a power supply signal drops to less than a potential threshold, such that the display drive circuit sequentially performs at least one of controlling the display panel to display a second picture that is monochrome and bleeding off charges in advance. As such, the charge may be bled off in advance before the potential of the power supply signal drops to less than the potential threshold and the regular XON starts, ensuring an effective release of residual charges in pixels.

It should be noted that, the specific implementation of the foregoing steps 2001 to 2003 may be seen with reference to the device embodiments, which is not repeated here.

Figure 21:
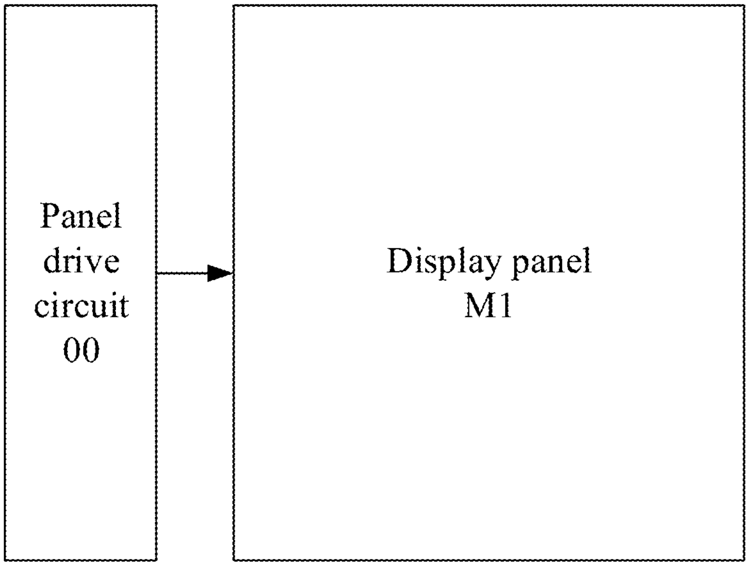
FIG. 21 is a schematic structural diagram of another display device according to some embodiments of the present disclosure.

FIG. 21 is a schematic structural diagram of a display device according to some embodiments of the present disclosure. As shown in FIG. 21, the display device includes: a display panel M1, a plurality of pixels P1 (not shown in FIG. 21) on the display panel M1, and the panel drive circuit 00 as shown in the above drawings.

The panel drive circuit 00 is coupled to the plurality of pixels P1, and the panel drive circuit 00 is configured to drive the plurality of pixels P1 to emit light and control charges in the plurality of pixels P1 to bleed off.

In some embodiments, the display device is any product or component with a display function, such as an LCD display device, a mobile phone, a tablet computer, a television, and a display.

Terms used in detailed description of the present disclosure are defined to merely explain the embodiments of the present disclosure and are not intended to limit the present disclosure. Unless otherwise defined, technical or scientific terms used in detailed description of the present disclosure should have the ordinary meanings as understood by those of ordinary skill in the art to which the present disclosure belongs.

For example, the words "first", "second", or "third", and other similar words, as used in the embodiments of the present disclosure do not indicate any order, quantity, or importance, but are merely defined to distinguish different components.

Likewise, the terms "a", "an" or other similar words do not indicate a limitation of quantity, but rather the presence of at least one.

The terms "include", "comprise" or other similar words indicate that the elements or objects stated before "include" or "comprise" encompass the elements or objects and equivalents thereof listed after "include" or "comprise", but do not exclude other elements or objects.

"Up", "down", "left", "right" or the like is only defined to indicate relative position relationship. In a case that the absolute position of the described object is changed, the relative position relationship may be changed accordingly.

"And/or" indicates that three relationships may be present. For example, A and/or B may indicate that only A is present, both A and B are present, and only B is present. The symbol "/" generally indicates an "or" relationship between the associated objects.

Described above are merely optional embodiments of the present disclosure and are not intended to limit the present disclosure. Any modifications, equivalent substitutions, improvements, and the like, made within the spirit and principle of the present disclosure, should be included in the protection scope of the present disclosure.

The invention claimed is:

1. A panel drive circuit applicable to a display device, the display device comprising: a display panel and a plurality of pixels on the display panel, the pixels comprising transistors, wherein the panel drive circuit comprises:

a panel control circuit and a display drive circuit, wherein the panel control circuit is coupled to a power supply terminal and the display drive circuit, respectively, and the display drive circuit is further configured to be coupled to the plurality of pixels, wherein the panel control circuit is configured to: transmit, in a case that the display panel is detected to be turned on, a first display drive signal to the display drive circuit based on a power supply signal of a first potential provided by the power supply terminal; and transmit, in a case that the display panel is detected to be turned off, at least one target signal of following signals sequentially to the display drive circuit before a potential of the power supply signal drops from the first potential to less than a potential threshold: a second display drive signal and a charge bleed-of signal; and the display drive circuit is configured to: drive the plurality of pixels to emit light based on the first display drive signal such that the display panel displays a plurality of frames of a first picture; drive the plurality of pixels to emit light based on the second display drive signal such that the display panel displays at least one frame of a second picture; and control the transistors in the plurality of pixels to be turned on based on the charge bleed-off signal to bleed off charges in the plurality of pixels, wherein the second picture is different from the first picture, and the second picture is a monochrome picture; wherein the display device further comprises: a backlight disposed at a side of the display panel;

the panel control circuit is further configured to detect a light emission state of the backlight and determine a work state of the display panel based on the light emission state of the backlight, wherein the backlight being in a light-emitting state indicates that the display panel is in a turn-on state, the backlight being in a non-light-emitting state indicates that the display panel is in a turn-off state, and in a case that the display panel is turned off, the backlight switches from the light-emitting state to the non-light-emitting state before the potential of the power supply signal starts to drop; and the panel control circuit is further configured to transmit the target signal to the display drive circuit in a case that the display panel is determined to be turned off based on the light emission state of the backlight;

the panel control circuit comprises: a light emission detection sub-circuit, a timing controller, a level shifter, and a switching sub-circuit;

the light emission detection sub-circuit is disposed at a side of the backlight and is coupled to a pull-down power terminal and an input interface of the timing controller, respectively, and the light emission detection sub-circuit is configured to control a connection between the pull-down power terminal and the input interface of the timing controller to be switched on in a case that the backlight is detected to be light-emitting, and control the connection between the pull-down power terminal and the input interface of the timing controller to be switched off in a case that the backlight is detected to be non-light-emitting;

the input interface of the timing controller is further coupled to the power supply terminal, an output interface of the timing controller is coupled to a control terminal of the switching sub-circuit, and the timing controller is configured to transmit a turn-on signal to the control terminal of the switching sub-circuit based on a pull-down power signal transmitted from the pull-down power terminal to the input interface, and transmit a turn-off signal to the control terminal of the switching sub-circuit based on the power supply signal transmitted from the power supply terminal to the input interface;

an input terminal of the switching sub-circuit is coupled to the power supply terminal, an output terminal of the switching sub-circuit is coupled to the pull-down power terminal and the level shifter, respectively, and the switching sub-circuit is configured to control a connection between the power supply terminal and the level shifter to be switched on in response to the turn-on signal, and control the connection between the power supply terminal and the level shifter to be switched off in response to the turn-off signal; and the level shifter is further coupled to the display drive circuit, and the level shifter is configured to transmit the target signal to the display drive circuit based on the pull-down power signal transmitted from the pull-down power terminal, and transmit the first display drive signal to the display drive circuit based on the power supply signal transmitted from the power supply terminal.

2. The panel drive circuit according to claim 1, wherein in a case that a display mode of the display panel is a normal black display mode, the second picture is a black picture; and in a case that the display mode of the display panel is a normal white display mode, the second picture is a white picture.

3. The panel drive circuit according to claim 1, wherein the display drive circuit is configured to: drive the plurality of pixels to emit light based on the second display drive signal such that the display panel displays an even number of frames of the second picture, and every two adjacent frames of the second picture have opposite polarities.

4. The panel drive circuit according to claim 3, wherein the display drive circuit is configured to: drive the plurality of pixels to emit light based on the second display drive signal such that the display panel displays two frames of the second picture.

5. The panel drive circuit according to claim 1, wherein the display device further comprises a host terminal;

the panel control circuit is further configured to be coupled to the host terminal, and to receive a control signal transmitted from the host terminal and determine a work state of the display panel based on the control signal, wherein the control signal being at a first potential indicates that the display panel is in a turn-on state, the control signal being at a second potential indicates that the display panel is in a turn-off state, and in a case that the display panel is turned off, a potential of the control signal changes from the first potential to the second potential before the potential of the power supply signal starts to drop; and the panel control circuit is further configured to transmit the target signal to the display drive circuit upon determining the display panel is to be turned off based on the control signal.

6. The panel drive circuit according to claim 5, wherein the control signal is a display input signal transmitted from the host terminal to the panel control circuit, and the panel control circuit is further configured to generate the first display drive signal based on the display input signal.

7. The panel drive circuit according to claim 5, wherein the control signal is a signal generated by the host terminal based on a detected work state of the display panel.

8. The panel drive circuit according to claim 1, wherein the light emission detection sub-circuit is a photoelectric conversion diode; and the switching sub-circuit comprises a switching transistor;

an input terminal of the photoelectric conversion diode is coupled to the pull-down power terminal, and an output terminal of the photoelectric conversion diode is coupled to the input interface of the timing controller; and the output interface of the timing controller is coupled to a gate of the switching transistor, a first electrode of the switching transistor is coupled to the power supply terminal, and a second electrode of the switching transistor is coupled to the pull-down power terminal.

9. The panel drive circuit according to claim 1, wherein the panel control circuit further comprises:

a first resistor connected between the power supply terminal and the input interface of the timing controller in series;

a second resistor connected between the power supply terminal and the output interface of the timing controller in series; and a third resistor connected between the pull-down power terminal and the output terminal of the switching sub-circuit in series.

10. The panel drive circuit according to claim 1, wherein the plurality of pixels are arranged in an array, and the display drive circuit comprises a gate driver and a source driver;

the gate driver is coupled to the plurality of pixels via a plurality of gate lines and is configured to transmit gate drive signals to the plurality of pixels row by row based on the first display drive signal and the second display drive signal, and transmit a turn-on signal to the transistors in the plurality of pixels based on the charge bleed-off signal;

the source driver is coupled to the plurality of pixels via a plurality of data lines and is configured to transmit data signals to the plurality of pixels based on the first display drive signal and the second display drive signal, and data signals transmitted from the source driver to the plurality of pixels based on the first display drive signal are different from data signals transmitted to the plurality of pixels based on the second display drive signal; and the plurality of pixels are configured to emit light in response to the gate drive signals and the data signals, and the transistors in the plurality of pixels are configured to be turned on in response to the turn-on signal.

11. The panel drive circuit according to claim 1, wherein the panel control circuit is further configured to: transmit, in a case that the display panel is detected to be turned off, the charge bleed-off signal to the display drive circuit before the potential of the power supply signal drops from the first potential to less than the potential threshold but greater than a second potential.

12. A method for charge bleed-off applicable to the panel control circuit comprised in the panel drive circuit as defined in claim 1, wherein the method for charge bleed-off comprises:

detecting whether the display panel is turned off;

transmitting, in a case that the display panel is detected to be turned on, a first display drive signal to a coupled display drive circuit based on a power supply signal of a first potential provided by a coupled power supply terminal; and transmitting, in a case that the display panel is detected to be turned off, at least one target signal of following signals sequentially to the display drive circuit before a potential of the power supply signal drops from the first potential to less than a potential threshold: a second display drive signal and a charge bleed-of signal, wherein the first display drive signal is used to instruct the display drive circuit to drive the plurality of pixels to emit light such that the display panel displays a plurality of frames of a first picture, the second display drive signal is used to instruct the display drive circuit to drive the plurality of pixels to emit light such that the display panel displays at least one frame of a second picture, and the charge bleed-off signal is used to instruct the display drive circuit to control transistors in the plurality of pixels to be turned on to bleed off charges in the plurality of pixels, wherein the second picture is different from the first picture, and the second picture is a monochrome picture.

13. A display device, comprising: a display panel, a plurality of pixels on the display panel, and a panel drive circuit, wherein the pixels comprises transistors, and the panel drive circuit comprises:

a panel control circuit and a display drive circuit, wherein the panel control circuit is coupled to a power supply terminal and the display drive circuit, respectively, and the display drive circuit is further configured to be coupled to the plurality of pixels, wherein the panel control circuit is configured to: transmit, in a case that the display panel is detected to be turned on, a first display drive signal to the display drive circuit based on a power supply signal of a first potential provided by the power supply terminal; and transmit, in a case that the display panel is detected to be turned off, at least one target signal of following signals sequentially to the display drive circuit before a potential of the power supply signal drops from the first potential to less than a potential threshold: a second display drive signal and a charge bleed-of signal; and the display drive circuit is configured to: drive the plurality of pixels to emit light based on the first display drive signal such that the display panel displays a plurality of frames of a first picture; drive the plurality of pixels to emit light based on the second display drive signal such that the display panel displays at least one frame of a second picture; and control the transistors in the plurality of pixels to be turned on based on the charge bleed-off signal to bleed off charges in the plurality of pixels, wherein the second picture is different from the first picture, and the second picture is a monochrome picture; wherein the display device further comprises: a backlight disposed at a side of the display panel; the panel control circuit is further configured to detect a light emission state of the backlight and determine a work state of the display panel based on the light emission state of the backlight, wherein the backlight being in a light-emitting state indicates that the display panel is in a turn-on state, the backlight being in a non-light-emitting state indicates that the display panel is in a turn-off state, and in a case that the display panel is turned off, the backlight switches from the light-emitting state to the non-light-emitting state before the potential of the power supply signal starts to drop; and the panel control circuit is further configured to transmit the target signal to the display drive circuit in a case that the display panel is determined to be turned off based on the light emission state of the backlight;

the panel control circuit comprises: a light emission detection sub-circuit, a timing controller, a level shifter, and a switching sub-circuit;

the light emission detection sub-circuit is disposed at a side of the backlight and is coupled to a pull-down power terminal and an input interface of the timing controller, respectively, and the light emission detection sub-circuit is configured to control a connection between the pull-down power terminal and the input interface of the timing controller to be switched on in a case that the backlight is detected to be light-emitting, and control the connection between the pull-down power terminal and the input interface of the timing controller to be switched off in a case that the backlight is detected to be non-light-emitting;

the input interface of the timing controller is further coupled to the power supply terminal, an output interface of the timing controller is coupled to a control terminal of the switching sub-circuit, and the timing controller is configured to transmit a turn-on signal to the control terminal of the switching sub-circuit based on a pull-down power signal transmitted from the pull-down power terminal to the input interface, and transmit a turn-off signal to the control terminal of the switching sub-circuit based on the power supply signal transmitted from the power supply terminal to the input interface;

an input terminal of the switching sub-circuit is coupled to the power supply terminal, an output terminal of the switching sub-circuit is coupled to the pull-down power terminal and the level shifter, respectively, and the switching sub-circuit is configured to control a connection between the power supply terminal and the level shifter to be switched on in response to the turn-on signal, and control the connection between the power supply terminal and the level shifter to be switched off in response to the turn-off signal; and the level shifter is further coupled to the display drive circuit, and the level shifter is configured to transmit the target signal to the display drive circuit based on the pull-down power signal transmitted from the pull-down power terminal, and transmit the first display drive signal to the display drive circuit based on the power supply signal transmitted from the power supply terminal.

14. The display device according to claim 13, wherein in a case that a display mode of the display panel is a normal black display mode, the second picture is a black picture; and in a case that the display mode of the display panel is a normal white display mode, the second picture is a white picture.

15. The display device according to claim 13, wherein the display drive circuit is configured to: drive the plurality of pixels to emit light based on the second display drive signal such that the display panel displays an even number of frames of the second picture, and every two adjacent frames of the second picture have opposite polarities.

16. The display device according to claim 15, wherein the display drive circuit is configured to: drive the plurality of pixels to emit light based on the second display drive signal such that the display panel displays two frames of the second picture.

17. The display device according to claim 13, wherein the display device further comprises a host terminal;

the panel control circuit is further configured to be coupled to the host terminal, and to receive a control signal transmitted from the host terminal and determine a work state of the display panel based on the control signal, wherein the control signal being at a first potential indicates that the display panel is in a turn-on state, the control signal being at a second potential indicates that the display panel is in a turn-off state, and in a case that the display panel is turned off, a potential of the control signal changes from the first potential to the second potential before the potential of the power supply signal starts to drop; and the panel control circuit is further configured to transmit the target signal to the display drive circuit upon determining the display panel is to be turned off based on the control signal.

18. The display device according to claim 17, wherein the control signal is a display input signal transmitted from the host terminal to the panel control circuit, and the panel control circuit is further configured to generate the first display drive signal based on the display input signal.

19. The display device according to claim 13, wherein the light emission detection sub-circuit is a photoelectric conversion diode; and the switching sub-circuit comprises a switching transistor;

an input terminal of the photoelectric conversion diode is coupled to the pull-down power terminal, and an output terminal of the photoelectric conversion diode is coupled to the input interface of the timing controller; and the output interface of the timing controller is coupled to a gate of the switching transistor, a first electrode of the switching transistor is coupled to the power supply terminal, and a second electrode of the switching transistor is coupled to the pull-down power terminal.

20. The display device according to claim 13, wherein the panel control circuit further comprises:

a first resistor connected between the power supply terminal and the input interface of the timing controller in series;

a second resistor connected between the power supply terminal and the output interface of the timing controller in series; and a third resistor connected between the pull-down power terminal and the output terminal of the switching sub-circuit in series.

* * * * *